(12) United States Patent
Wong et al.

(10) Patent No.: US 12,314,494 B2
(45) Date of Patent: May 27, 2025

(54) SYSTEM AND METHOD FOR SOFTWARE APPLICATION PERFORMANCE-SPECIFIC DATA PACKET COMMUNICATION AND POLLING SYSTEM FOR WIRELESS INPUT/OUTPUT (IO) DEVICES

(71) Applicant: Dell Products, LP, Round Rock, TX (US)

(72) Inventors: Kai Leong Wong, Singapore (SG); Jui Chang Liu, New Taipei (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/227,970

(22) Filed: Jul. 30, 2023

(65) Prior Publication Data
US 2025/0036222 A1  Jan. 30, 2025

(51) Int. Cl.
*G06F 3/038*       (2013.01)
*G06F 13/38*       (2006.01)

(52) U.S. Cl.
CPC ............ *G06F 3/038* (2013.01); *G06F 13/385* (2013.01); *G06F 2203/0384* (2013.01)

(58) Field of Classification Search
CPC . G06F 3/038; G06F 13/385; G06F 2203/0384
See application file for complete search history.

(56) References Cited

U.S. PATENT DOCUMENTS

| 7,801,099 | B2 | 9/2010 | Desai |
| 7,853,663 | B2 | 12/2010 | Hoerl |
| 8,364,080 | B2 | 1/2013 | Desai |
| 8,823,494 | B1* | 9/2014 | Kovitz ................. H04W 12/50 |
| | | | 398/128 |
| 8,913,599 | B2 | 12/2014 | Gonikberg |
| 2014/0047143 | A1* | 2/2014 | Bateman ............. H04L 65/1069 |
| | | | 710/72 |

(Continued)

FOREIGN PATENT DOCUMENTS

EP          1841149 B1     11/2017

*Primary Examiner* — Henry Tsai
*Assistant Examiner* — Aurangzeb Hassan
(74) *Attorney, Agent, or Firm* — Prol Intellectual Property Law, PLLC; H. Kenneth Prol

(57) ABSTRACT

A software application performance-specific input/output (IO) device wireless communication packet polling and reception system executing at a wireless communication dongle of an information handling system comprising a controller to transmit, with a wireless radio system, an initial polling packet to instruct transmission of a packet frame by a wireless IO device in wireless communication with the wireless communication dongle, and the controller to identify a software application currently executing at the information handling system associated with a wireless IO device prioritized performance metric identified to impact performance of the software application. The controller to execute code instructions to identify, for a wireless IO device, an application suited data packet number and length for the packet frame estimated to meet the wireless IO device prioritized performance metric for performance of the software application.

20 Claims, 5 Drawing Sheets

(56) References Cited

U.S. PATENT DOCUMENTS

| | | | | |
|---|---|---|---|---|
| 2014/0280709 A1* | 9/2014 | Li | .................... | G06F 13/385 |
| | | | | 709/217 |
| 2015/0254193 A1* | 9/2015 | Priest | .................... | G06F 13/385 |
| | | | | 710/5 |
| 2016/0360526 A1* | 12/2016 | Lehmann | ............... | G06F 3/0227 |
| 2018/0139131 A1* | 5/2018 | Ignatchenko | ........... | H04L 47/32 |
| 2019/0197556 A1* | 6/2019 | Moshal | ................ | G06Q 20/326 |
| 2019/0371096 A1* | 12/2019 | Fisher | ................ | G07C 9/00904 |
| 2020/0146097 A1* | 5/2020 | Haartsen | ............. | H04M 1/6066 |
| 2023/0171191 A1* | 6/2023 | Ignatchenko | ......... | H04L 45/745 |
| | | | | 370/392 |

\* cited by examiner

SYSTEM AND METHOD FOR SOFTWARE APPLICATION PERFORMANCE-SPECIFIC DATA PACKET COMMUNICATION AND POLLING SYSTEM FOR WIRELESS INPUT/OUTPUT (IO) DEVICES

FIELD OF THE DISCLOSURE

The present disclosure generally relates to wireless peripheral input/output (IO) devices, such as mice, keyboards, earbuds, headphones, headsets, and virtual reality peripherals. More specifically, the present disclosure relates to a wireless communication from an information handling system, operating independently from the information handling system operating system (OS) for orchestrating transmission by one or more wireless peripheral IO devices of data packets to the information handling system that is specifically suited for performance of a software application executing at the information handling system and an operatively coupled wireless peripheral IO device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more peripheral input/output devices such as a keyboard, mouse, touchpad, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
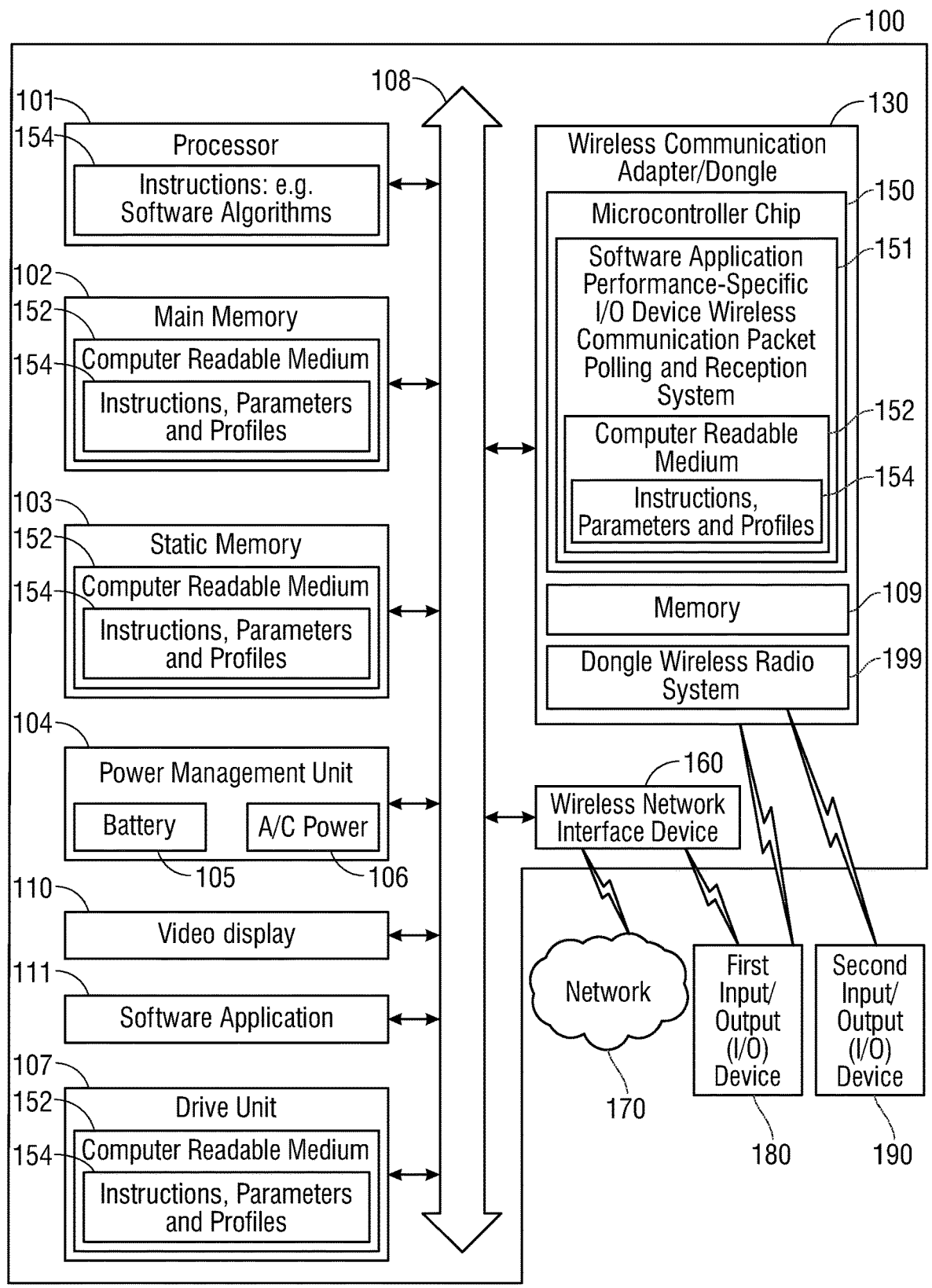
FIG. 1 is a block diagram illustrating an information handling system with a wireless radio system or operatively coupled to a wireless communication adapter/dongle orchestrating wireless communication with plural wireless input/output (IO) devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless peripheral input/output (IO) devices, also referred to as wireless IO devices herein, (e.g., mouse, keyboard, earbuds, headphones, smart speakers, headsets including headphones and speakers, or virtual reality peripherals) located remotely from the information handling system to wirelessly transmit and receive IO data such as keystrokes, mouse positional data, or audiovisual information. Many existing systems employ a wireless communication adapter/dongle operably connected to the information handling system (e.g., desktop, laptop, or tablet computer) to pair with and communicate wirelessly with one or more of these wireless IO devices. In other embodiments, a wireless communication adapter/dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities, for example, that comply with the Bluetooth® Low Energy (BLE) communication standard.

For example, many existing wireless IO devices are designed to communicate with a wireless communication adapter/dongle using a one reception/one transmission (1TX/1RX) format that requires a wireless communication adapter/dongle to respond to every data packet received from a wireless IO device by transmitting an acknowledgment (ACK) data packet. In other words, each time the wireless communication adapter/dongle operating in receive mode receives a data packet, it must then switch to transmit mode and transmit an ACK data packet back to the wireless IO device from which the initial data packet was received. The wireless communication adapter/dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases.

Each of these transmission/reception mode switches consumes power, requires more airtime for acknowledgments, and causes a high potential for collision between incoming wireless IO device data packets and outgoing ACK data packets. In the case of such a collision, the wireless communication adapter/dongle may fail to transmit an ACK data packet (as no data packet has been received by the dongle from the wireless IO device due to the collision), and the wireless IO device may then either resend the missed data packet or skip this resend and simply transmit the next available data packet. Such a 1TX/1RX system may be limited in data throughput and consume power unnecessarily for such transmit and receive switches during operations. Such systems may cause the customer to experience slow response from a wireless IO device, a lag between their input via the wireless IO device (e.g., movement of the mouse) and the corresponding feedback displayed by the information handling system (e.g., movement of the cursor), or may cause the cursor to jump suddenly from one position to another (e.g., when the wireless mouse opts to skip resend of the missed packet). As a result, existing systems employing this 1TX/1RX approach may fail to meet customer needs during execution of latency-sensitive software applications such as gaming applications or other high definition audio/visual applications.

The software application performance-specific IO device wireless communication packet polling and reception system in embodiments of the present disclosure orchestrate scheduled delivery of a plurality of data packets from each of one or more wireless IO devices in a data packet communication frame between delivery of ACK data packets to each of those one or more wireless IO devices in 1 TX/1 RX systems. In embodiments of the present disclosure, a wireless radio adapter, such as in a wireless communication adapter/dongle, may receive a request to connect from one or more wireless IO devices (e.g., mouse and headset), and may respond by transmitting a polling packet that instructs each of the wireless IO devices paired with the wireless communication adapter/dongle to transmit a specified number of data packets of a specified length and at specified time slots during a first data packet communication frame between the wireless communication adapter/dongle and each of the paired wireless IO devices. The software application performance-specific IO device wireless communication packet polling and reception system selects the number of data packets and length of data packets based on a software application detected as executing on the information handling system and a wireless IO device being used according to embodiments herein. A microcontroller executing code instructions of the software application performance-specific IO device wireless communication packet polling and reception system at the wireless communication adapter/dongle may ensure that, during this first data packet communication frame in which time slots have been allocated to the one or more wireless IO devices (e.g., mouse and headset), the wireless radio system, such as in the wireless communication adapter/dongle, remains in a receive mode to receive data packets from the one or more paired wireless IO devices in accordance with the number of packets prescribed and the duration (e.g., based on packet lengths) prescribed as suitable for an executing software application from each of the one or more wireless IO devices. In other words, the controller of the wireless communication adapter/dongle or other wireless radio adapter may avoid any power loss from additional airtime or inadvertent collision threat due to rapid switching between RX/TX modes during this first data packet communication frame.

Following the first data packet communication frame at the end of a time period determined by the number of packets expected, packet lengths, and any spacing time, the controller of the wireless communication adapter/dongle or other wireless radio adapter executing code instructions of the software application performance-specific IO device wireless communication packet polling and reception system may switch to transmit mode and transmit to each of the paired wireless IO devices an acknowledgement packet identifying the number of packets received during the first data packet communication frame from each of the paired wireless IO devices. In addition, this acknowledgement packet may further include instructions for the one or more paired wireless IO devices to transmit a selected, specified plurality of data packets of a specified length prescribed as suitable for an executing software application and at specified time slots during a second data packet communication frame between the wireless communication adapter/dongle and each of the paired wireless IO devices. This specified number of packets, packet lengths, and specified time slots may remain the same as in the first data packet communication frame or may be adjusted according to various embodiments herein for the second data packet communication.

This orchestration of data packets transmitted from one or more wireless IO devices to the wireless dongle or wireless radio system executing code instructions of the software application performance-specific IO device wireless communication packet polling and reception system presents an opportunity to tailor the specified number of packets and specified packet lengths identified within these polling packets suited to performance of a wireless IO device suitable for providing input for one or more detected software applications executing at the information handling system. Such performance may be gauged according to one or more wireless IO device prioritized performance metrics for the executing software application and stored within one or more performance policies for the wireless IO device or devices (e.g., mouse) at the wireless communication adapter/dongle, at the wireless communications radio system, or elsewhere in the information handling system. For example, some software applications may be associated with a developer-specified or user-specified prioritized performance metric for low latency between transmission of the first data packet within consecutive data packet communication frames (e.g., inter-frame latency), for minimum number of data packets received from the wireless IO device at the wireless communication adapter/dongle per second, or a required speed at which a wireless mouse transmits each positional measurement of the mouse to the wireless dongle or wireless radio system, which may be referred to herein as a "wireless communication adapter/dongle report rate," or a "wireless communication radio system report rate," as is suitable for particular executing software applications In existing systems that only allow for transmission of data packets limited to 8 bytes, the data packet report rate and the wireless communication adapter/dongle report rate may be equivalent to one another. This may be the case because each data packet being limited to 8 bytes further limits each data packet to carrying a single pair of coordinates or positional information for a wireless mouse, for example. However, the orchestration of data packets transmitted from one or more wireless IO devices to the wireless communication adapter/dongle or wireless radio system executing code instructions of the software application performance-specific IO device wireless communication packet polling and reception system allows for the transmission of data packets having more than 8 bytes, such as 16 bytes or 32 bytes, depending on prioritized performance metrics for the executing software application. Thus, each data packet may include more than one pair of coordinates or positional information of the wireless mouse in the example embodiment in a longer specified data packet length. This may increase the wireless communication adapter/dongle report rate (e.g., speed at which a wireless mouse transmits each positional measurement) without increasing the data packet transmission rate (e.g., speed at which data packet is transmitted). This allows for fine-tuning of the wireless IO device data packet number and data packet length to accommodate wireless IO device prioritized performance metrics for the wireless IO mouse associated with specific software applications executing at the information handling system.

In some cases, developers or users may prioritize one of these wireless IO device prioritized performance metrics (e.g., lower inter-frame latency, higher data packet transmission rate, or higher wireless communication adapter/dongle report rate) over the other for particular software applications or operational phases of an executing software application. For example, gaming software applications may prioritize a high wireless communication adapter/dongle report rate over low inter-frame latency or data packet transmission rate. In other cases, for other types of software applications, the opposite may be true. In still other cases, the developer or the user may provide a maximum inter-frame latency threshold allowable, a minimum data packet transmission rate threshold allowable, or a minimum dongle report rate threshold allowable for determining a number of packets or packet lengths selected as suitable for a wireless IO devices prioritized performance metric for a software application while prioritizing one of the other wireless IO device prioritized performance metrics to ensure user satisfaction during execution of the software application.

Upon pairing of a wireless IO device with the wireless communication adapter/dongle or wireless radio system in embodiments of the present disclosure, a controller for the wireless communication adapter/dongle or wireless radio system may execute code instructions of the software application performance-specific IO device wireless communication packet polling and reception system to identify one or more software applications currently executing at the information handling system and identify the performance policy for the paired wireless IO device pertaining to that detected software application. In embodiments of the present disclosure, the performance policy for the wireless IO device may identify one or more wireless IO device prioritized performance metrics and prioritize for one over the other, if applicable, based on the identified software application currently executing at the information handling system. A controller for the wireless communication adapter/dongle or wireless communication radio system in embodiments may access an estimated wireless IO device data packet communication performance table stored in firmware for the controller to identify and select a wireless IO device application suited data packet number and a wireless IO device application suited data packet length that is estimated to meet the software application specific wireless IO device prioritized performance metrics identified within the performance policy for the paired wireless IO device. The controller of the wireless communication adapter/dongle or wireless communications radio system may then generate and transmit to the wireless IO device a polling packet instructing transmission of a number of selected data packets corresponding to the wireless IO device application suited data packet number having the wireless IO device application suited data packet length during an upcoming data packet communication frame. In such a way, the software application performance-specific IO device wireless communication packet polling and reception system may tailor the selected, specified number of packets and selected, specified packet lengths identified within these polling packets suited for high performance of one or more software applications executing at the information handling system.

FIG. 1 illustrates an information handling system 100 according to several aspects of the present disclosure. As described herein, an information handling system 100 or a controller 150 of a wireless communication adapter/dongle or integrated wireless radio adapter 130 operably connected to the information handling system 100 may execute code instructions of a software application performance-specific IO device wireless communication packet polling and reception system 151 in an embodiment to orchestrate scheduled delivery of a plurality of data packets from each of a plurality of paired wireless input/output (IO) devices (e.g., 180 and 190) during scheduled data packet communication frames and selected to meet wireless IO device prioritized performance metrics for a detected executing software application. It is appreciated that information handling system 100 may use a wireless communication adapter/dongle or integrated wireless radio adapter 130 to wirelessly communicate with one or more wireless IO devices 180 or 190. In embodiments herein, wireless communications adapter/dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications adapter/dongle 130, whether integrated or not within the information handling system 100 may operate using the Bluetooth® Low Energy (BLE) radio layer protocol as modified by wireless IO device communication protocols of the embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices 103 or 107, a wireless network interface device 160, and an internal or external wireless communication adapter/dongle 130 (for example, an external wireless communication adapter/dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 in an embodiment is operably coupled to a wireless communications adapter/dongle 130, which may orchestrate scheduled delivery of a plurality of data packets from each of a plurality of wireless input/output (IO) devices (e.g., 180 and 190) during scheduled data packet communication frames according to various embodiments of the present disclosure. The wireless communication adapter/dongle 130 or integrated wireless radio adapter in an embodiment may house a microcontroller 150 executing firmware instructions of the software application performance-specific IO device wireless communication packet polling and reception system 151 in an embodiment. The wireless communication adapter/dongle 130 may be a dongle in one embodiment that is operatively coupled to the information handling system 100 through insertion of the wireless communication adapter/dongle within a USB port of the information handling system 100, for example. In another embodiment, the wireless communication adapter/dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art. In some embodiments, the wireless communication adapter/dongle 130 may be referred to as just a wireless communication adapter/dongle.

The wireless communication adapter/dongle 130 in an embodiment may be wirelessly coupled to one or more wireless input output (IO) devices 180 and 190 capable of wirelessly receiving and transmitting data via the Bluetooth® wireless radio protocol with the wireless communication adapter/dongle 130 as modified by wireless IO device communication protocols of the embodiments herein. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication adapter/dongle wireless radio system 199 or other integrated wireless radio adapter in an embodiment may be capable of communication between the information handling system 100 and the paired wireless IO devices 180 and 190 using a wireless link established using Bluetooth® technology such as Bluetooth® or Bluetooth Low Energy (BLE) radio protocols as modified by wireless IO device communication protocols of the embodiments herein, for example. The wireless communication adapter/dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number.

The wireless communication adapter/dongle wireless radio system 199 may provide connectivity of the wireless communication adapter/dongle 130 operatively coupled to the information handling system 100 via wireless links to one or more operatively coupled wireless input/output devices 180 or 190, such as mouse, keyboard, earbuds, headphones, smart speakers, or virtual reality peripherals, as described in greater detail herein. Such wireless links may be established pursuant to Bluetooth® or Bluetooth Low Energy® (BLE) radio protocols as modified by wireless IO device communication protocols of the embodiments herein, for example. In some embodiments, the Bluetooth® radio protocols or BLE radio protocols (e.g., protocols established under the Institute of Electrical and Electronics Engineers protocol 802.15.1) may be used to establish a Private Area Network (PAN) (e.g., 170) in which the information handling system 100 may communicate wirelessly with any wireless IO devices (e.g., 180 and 190) paired to the PAN 170 using a Bluetooth® compliant pairing and wireless communication profile as modified by wireless IO device communication protocols of the embodiments herein. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHZ. Reference to Bluetooth® may refer to either or both of the Bluetooth® or Bluetooth Low Energy (BLE) radio protocols and any revision of those protocols and which are modified under wireless IO device communication protocols of the embodiments herein.

In some aspects of the present disclosure, the wireless communication adapter/dongle wireless radio system 199 may operate two or more wireless links. In other aspects of the present disclosure, the wireless communication adapter/dongle 130 may include a plurality of wireless communication adapter/dongle wireless radio systems, each capable of establishing a separate wireless link to one of the plurality of wireless IO devices (e.g., 180 or 190), such that the wireless communication adapter/dongle 130 may be in communication with a plurality of wireless IO devices (e.g., 180 and 190) via a plurality of wireless links.

The wireless communication adapter/dongle wireless radio system 199 may also operate in accordance with any Bluetooth® radio protocol as modified according to embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.300 to 2.4835 GHZ Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication adapter/dongle wireless radio system 199 may communicate voice, video or data to the wireless communication adapter/dongle 130. The wireless communication adapter/dongle 130 may include a set of instructions 154 that may be executed via a microcontroller 150, for example, to cause the wireless communication adapter/dongle 130 to perform any one or more of the methods or computer-based functions disclosed herein. For example, instructions 154 may include a particular example of a software application performance-specific IO device wireless communication packet polling and reception system 151, or other aspects or components. Application instructions 154 may also include any application processing drivers, or the like executing on information handling system 100 or wireless communication adapter/dongle 130.

The software application performance-specific IO device wireless communication packet polling and reception system 151 may utilize a computer-readable medium 152 in which one or more sets of instructions 154 may operate in part as firmware instructions, software instructions, or a combination executed by microcontroller 150 on the wireless communication adapter/dongle 130. The instructions 154 may embody one or more of the methods as described herein. For example, instructions relating to the software application performance-specific IO device wireless communication packet polling and reception system 151, firmware or software algorithms, processes, and/or methods may be stored here. More specifically, instructions 154 may be executed by microcontroller integrated circuit 150 or other processing resources such as an embedded controller (EC) or the processor 101 to orchestrate transmission of data packets from one or more wireless IO devices 180 and 190 with the wireless communication adapter/dongle 130 during a data packet communication frames according to embodiments herein. In other embodiments, the instructions 154 may be executed via a controller within the integrated wireless network interface device or wireless radio adapter 160 of the information handling system 100.

Memory 109 located and controlled by the wireless communication adapter/dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the software application performance-specific IO device wireless communication packet polling and reception system 151 may be stored in memory 109 on a computer-readable medium 152 such as a flash memory or magnetic disk in an example embodiment, or may be stored in main memory 102, static memory 103, or within drive unit 107. After an initial pairing process between the wireless communication adapter/dongle 130 and a plurality of wireless IO devices (e.g., 180 and 190), the microcontroller 150 may execute code instructions 154 of the software application performance-specific IO device wireless communication packet polling and reception system 151 to orchestrate transmission of a plurality of data packets from one or more of the wireless IO devices (e.g., 180 or 190) during one or more data packet communication frames, as described in embodiments herein. Memory 109 in an embodiment may also store one or more performance policies with wireless IO device prioritized performance metrics for paired wireless IO devices, and an estimated wireless IO device data packet communication performance table for tailoring and selecting a specified number of packets and specified packet lengths transmitted by a wireless IO device (e.g., 180 or 190) suited for high performance of one or more software applications 111 (e.g., gaming software application) executing at the information handling system 100, as described in greater detail herein.

The information handling system 100 may include a memory 102, (with computer readable medium 152 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1 or any combination thereof. Additional components of the information handling system 100 may include one or more storage devices 103 or 107, a wireless network interface device 160, a wireless communication adapter/dongle 130, one or more communications ports for communicating with external devices, as well as various input and output (IO) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101, the wireless network interface device 160, various components of the wireless communication adapter/dongle 130 (e.g., microcontroller chip 150, memory 109, or wireless communication adapter/dongle wireless radio system 199), a static memory 103 or drive unit 107 or other components of an information handling system. The information handling system 100 may include a processor 101 such as a central processing unit (CPU), a GPU, a Visual Processing Unit (VPU), or a hardware accelerator, embedded controllers or some combination of the same. Any of the processing resources may operate to execute code that is either firmware or software code.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for software executing on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
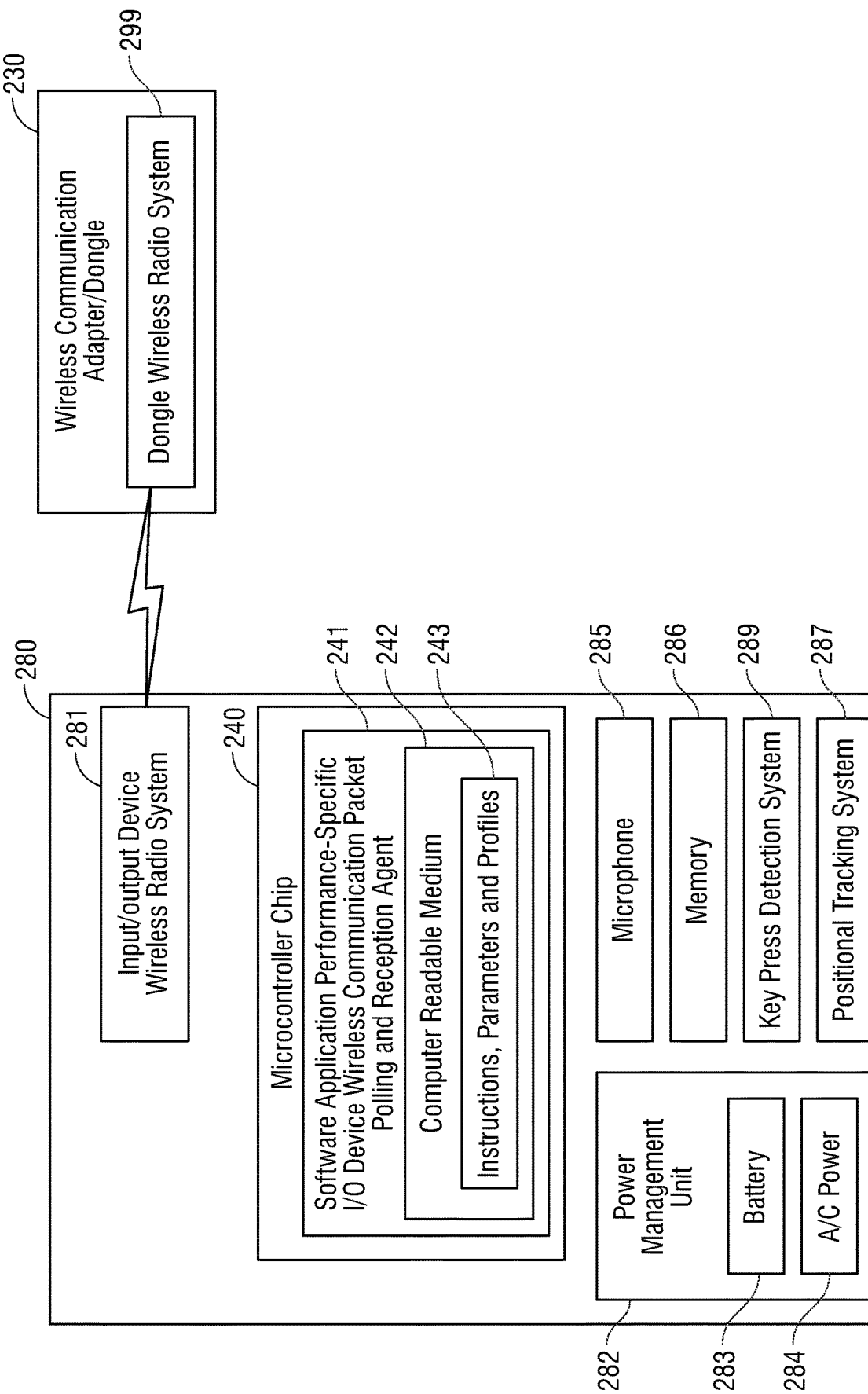
FIG. 2 is a block diagram illustrating a wireless IO device wirelessly paired to a wireless radio adapter or a wireless communication adapter/dongle that is operatively coupled to an information handling system according to an embodiment of the present disclosure.

FIG. 2 is a graphical diagram illustrating a wireless communication adapter/dongle 230 wirelessly paired to a wireless input/output (IO) device 280 according to an embodiment of the present disclosure. As described previously, the wireless communication adapter/dongle 230 may be a dongle device paired to an information handling system or a wireless Bluetooth® radio integrated within an information handling system in various embodiments herein. The wireless IO device 280 in various embodiments herein may comprise a mouse, a keyboard, an audio headset, earbuds, gaming controllers, or various peripheral virtual reality devices (e.g., headset or handheld controllers). A power management unit 282 with a battery 283 or A/C power charging adapter 284 may be on the wireless IO device 280 to provide power to the microcontroller chip 240, the speaker 288, the microphone 285, or other components of the wireless IO device 280. In an embodiment, the wireless IO device 280 may include a microcontroller chip 250 that may be any device or devices that execute instructions, parameters, and profiles 243 of a software application performance-specific IO device wireless communication packet polling and reception agent 240 at the wireless IO device 280 to transmit data packets from the wireless IO device 280 to the wireless communication adapter/dongle 230 during a data packet communication frame according to orchestrating instructions received from the wireless communication adapter/dongle 230.

As described herein, the wireless communication adapter/dongle 230 in an embodiment may include a controller executing code instructions of an software application performance-specific IO device wireless communication packet polling and reception system to orchestrate transmission of plural data packets from one or more paired wireless IO devices (e.g., 280) during any data packet communication frame. A selected number of packets and selected packet length may be determined for wireless packet communications between polling packets from a wireless dongle with acknowledgement by the software application performance-specific IO device wireless communication packet polling and reception system. The selected number of packets and selected packet length to be sent in response to a polling packet may be determined from wireless IO device prioritized performance metrics suitable for an executing software application detected on the information handling system operatively coupled to the wireless communication adapter/dongle 230 in embodiments herein. Such an orchestration may be initiated by transmission from the dongle wireless radio system 299 to the IO device wireless radio system 281 of one or more polling packets to each elicit plural data packets, as described herein. The software application performance-specific IO device wireless communication packet polling and reception agent 241 of the wireless IO device 280 may operate to instruct the IO device wireless radio system 281 to transmit a selected number of data packets within a synchronized data packet communication frame between the wireless communication adapter/dongle 230 and the wireless IO device 280 according to the received polling packets having coordinating instructions as to the selected number of packets, the selected packet lengths, and time slots to be used to meet wireless IO device prioritized performance metrics of an identified software application.

The IO wireless radio system 281 in an embodiment may be capable of communication between the wireless IO device 280 and the wireless communication adapter/dongle 230 using a wireless link established under radio protocols such as Bluetooth® or Bluetooth Low Energy radio protocols, for example. The IO device wireless radio system 281 may provide connectivity of the wireless IO device 280 to the wireless communication adapter/dongle 230, external or integrated, and is operatively coupled to the information handling system via one or more wireless links. Such wireless links may be established pursuant to Bluetooth® or Bluetooth Low Energy® (BLE) radio protocols and using data modulation as modified by the wireless IO device communication protocol of embodiments of the present disclosure, for example. The IO device wireless radio system 281 may operate in accordance with any Bluetooth® radio protocol as modified by wireless IO device communication protocols of the embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.300 to 2.4835 GHZ Industrial, Scientific, and Medical (ISM) band.

The present disclosure contemplates a computer-readable medium 242 that includes instructions, parameters, and profiles 243 or receives and executes instructions, parameters, and profiles 243 responsive to a propagated signal, so that the IO device wireless radio system 281 may communicate voice, video or data to the wireless communication adapter/dongle 230, integrated or operatively coupled to the information handling system. Computer-readable medium 242 can also include code instructions for the software application performance-specific IO device wireless communication packet polling and reception agent 241. In an embodiment in which the wireless IO device 280 comprises a mouse, the wireless IO device 280 may further include a position tracking system 287 capable of recording or tracking changes in position of the mouse, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication adapter/dongle 230. This positional information for the mouse or correlated changes to cursors or other graphical representations at the information handling system may be transmitted within 8 byte coordinate data to the dongle wireless radio system 299 as described herein. In some embodiments, a single data packet may comprise one of these 8 byte coordinate data. In other embodiments, a single data packet may comprise two of these 8 byte coordinate data or so forth for different packet lengths. The system may tailor a selected data packet length to accommodate plural pairs of positional data to provide for increased report rate or throughput with the data packet communication frame of the wireless communication stander according to some embodiments herein.

The controller executing code instructions of the software application performance-specific IO device wireless communication packet polling and reception system at the wireless communication adapter/dongle 230 in an embodiment may instruct the transmission of either one or two of these 8 byte coordinate data within a single data packet by defining the selected wireless IO device application suited data packet length of either 8 bytes (e.g., including only one 8 byte coordinate data) or 16 bytes (e.g., including two of these 8 byte coordinate data) that is suitable for wireless IO device prioritized performance metrics for the software application currently executing at the information handling system and policies for the wireless IO device 280 associated with that software application. The microcontroller 240 at the wireless IO device 380 may receive these instructions and execute the software application performance-specific IO device wireless communication packet polling and reception agent 241 to orchestrate a response with the selected number of packets and selected packet lengths of data to be received by the wireless communication adapter/dongle 230 according to embodiments herein. In another embodiment in which the wireless IO device 280 comprises a keyboard, the wireless IO device 280 may further include a key press detection system 289 that identifies specific keys pressed by a user. Such key press data may be transmitted as data packets to the dongle wireless radio system 299 as described herein. In yet another embodiment in which the wireless IO device 280 comprises a headset or earbuds, for example, the wireless IO device 280 may further include a microphone 285 for recording of audio user input. Such audio user input in an embodiment may be transmitted as data packets to the dongle wireless radio system 299 as described herein.

Instructions 243 of the software application performance-specific IO device wireless communication packet polling and reception agent 241 may be executed by the microcontroller chip 250, for example a controller integrated circuit, to transmit such selected number of data packets at a selected length to the wireless communication adapter/dongle 230 at an information handling system pursuant to polling packets generated at the software application performance-specific IO device wireless communication packet polling and reception system operating at the wireless communication adapter/dongle 230 and transmitted to the wireless IO device 280. Such instructions 243 of the software application performance-specific IO device wireless communication packet polling and reception agent 241 may include instructions for transmission of data packets by the IO device wireless radio system 281 of a wireless IO device application suited data packet number, having a wireless IO device application suited data packet length, at wireless IO device application suited data packet transmission time slots, as identified within polling packets received at the wireless IO device 280 from the wireless communication adapter/dongle 230. Identifying information for the wireless IO device 280 may be stored in memory 286 in an embodiment. Such identifying information in an embodiment may operate to identify the wireless IO device 280 as a device authorized to transceive data with the dongle 230, as well as information sufficient to identify the wireless IO device 280, such as a Media Access Control (MAC) address, IP address, or model number.

The wireless IO device 280 may, in some embodiments includes a processing resource such as a microcontroller 240. Any of the processing resources described herein may be used and may operate to execute code that is either firmware or software code. Instructions 243 may include a software application performance-specific IO device wireless communication packet polling and reception agent 241 or other software applications or drivers detectable by the microcontroller 240 or other processing resource. The instructions 243 in an embodiment may reside completely, or at least partially, within the memory 286.

The wireless IO device 280 may include a set of instructions 243 that may be executed to cause the processing resource such as a microcontroller at the wireless IO device 280 to perform any one or more of the methods or computer-based functions disclosed herein. For example, instructions 243 may include a particular example of a software application performance-specific IO device wireless communication packet polling and reception agent 241, or other aspects or components. The software application performance-specific IO device wireless communication packet polling and reception agent 241 on the wireless IO device 280 may utilize a computer-readable medium 242 in which one or more sets of instructions 243 such as firmware executed with microcontroller chip 240, for example a controller integrated circuit with embedded firmware in an example embodiment. In other embodiments, the software application performance-specific IO device wireless communication packet polling and reception agent 241 may operate in part as software or firmware instructions executed on the wireless IO device 280. The instructions 243 may embody one or more of the methods as described herein. For example, instructions relating to the software application performance-specific IO device wireless communication packet polling and reception agent 241, firmware or software algorithms, processes, and/or methods may be stored here.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles 243 of the software application performance-specific IO device wireless communication packet polling and reception agent 241 may be stored in memory 286 on a computer-readable medium 242 such as a flash memory or magnetic disk in an example embodiment.

Figure 3:
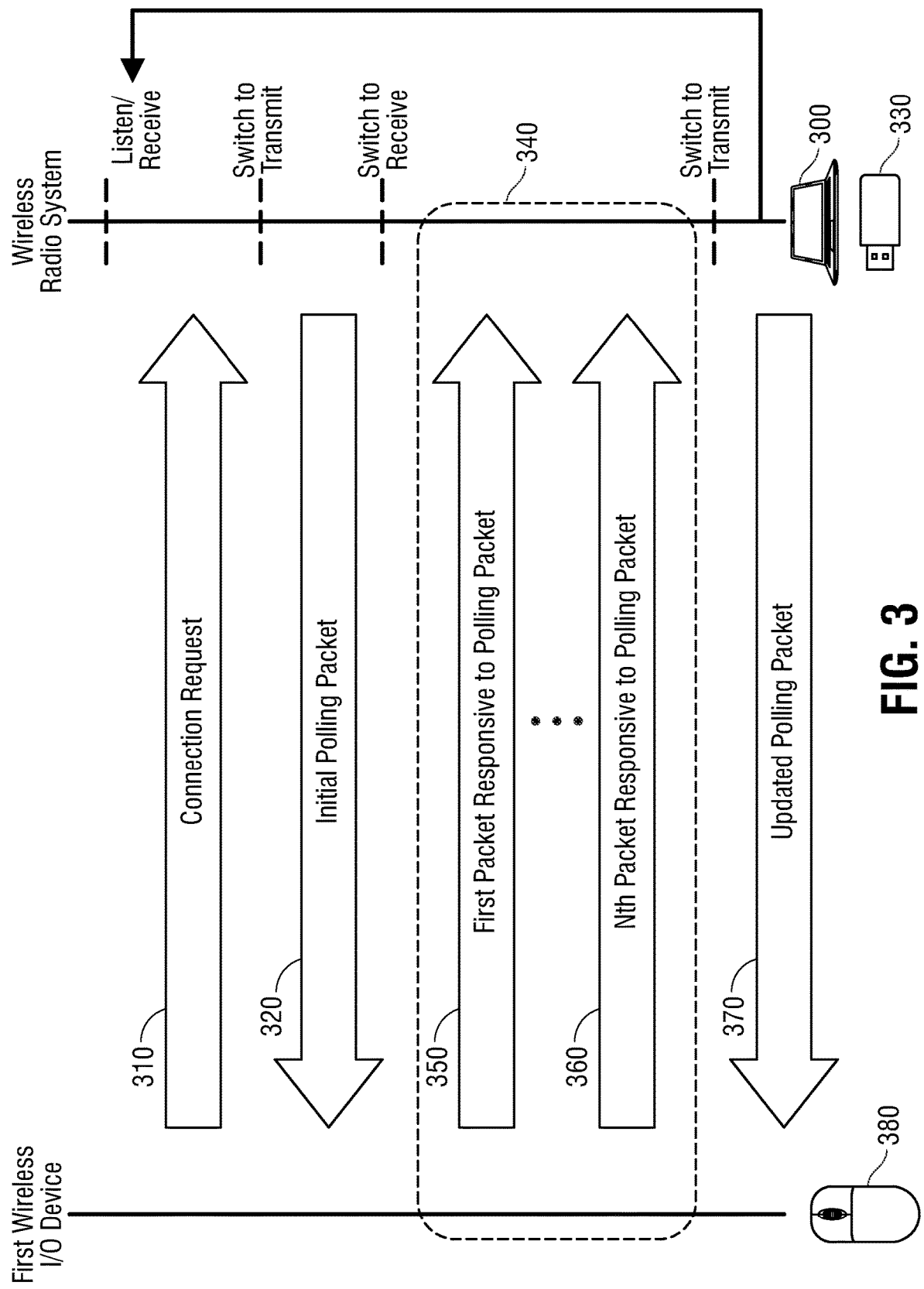
FIG. 3 is a block diagram illustrating a data packet communication frame orchestrated by the software application performance-specific IO device wireless communication packet polling and reception system according to an embodiment of the present disclosure.

FIG. 3 is a block diagram illustrating a data packet communication frame between a wireless communication adapter/dongle or integrated wireless radio system and a paired wireless input/output (IO) device orchestrated by a controller of the wireless communication adapter/dongle or integrated wireless radio system executing code instructions of the software application performance-specific IO device wireless communication packet polling and reception system according to an embodiment of the present disclosure. As described herein, the software application performance-specific IO device wireless communication packet polling and reception system executing at an information handling system 300 or via a controller within a wireless communication adapter/dongle 330 operably connected to the information handling system 300 in an embodiment may schedule receipt of a plurality of data packets from one or more paired wireless IO devices (e.g., mouse 380) between transmission of polling packets that include an acknowledgement header (ACK) to each of those one or more paired wireless IO devices (e.g., mouse 380). These scheduled deliveries of packets may include a selected number of packets or selected packet lengths in accordance with the wireless IO device prioritized performance metric or metrics for a detected executing software application according to embodiments herein. For ease of explanation, the software application performance-specific IO device wireless communication packet polling and reception system in various embodiments herein may be described as executing at the wireless communication adapter/dongle 330 in some embodiments herein. However, it is also contemplated that the software application performance-specific IO device wireless communication packet polling and reception system may operate internally within an integrated wireless radio system of the information handling system 300 in an embodiment. In other embodiments, the wireless communication adapter/dongle 330 or integrated wireless radio system is capable of establishing wireless links with the wireless IO device 380 according to the Bluetooth® or Bluetooth® Low Energy (BLE) radio layer protocols and as modified by wireless IO device communication protocols of the embodiments herein.

In an embodiment, the wireless communication adapter/dongle 330 (or information handling system 300) may be placed within a receive (RX) mode. Within this RX mode, a wireless radio system of the wireless communication adapter/dongle 330 or the information handling system 300 may scan a plurality of frequencies at which wireless IO devices (e.g., 380) may be expected to transmit requests to communicate with the wireless communication adapter/dongle 330 or the information handling system 300. While in this RX mode, the wireless radio system of the wireless communication adapter/dongle 330 or the information handling system 300 may receive the request to connect 310 with the wireless communication adapter/dongle 330 or the information handling system 300. This connection request 310 in some embodiments may include an identification of the model number or various default communication metrics for the mouse 380 or other identifying information for the mouse 380 or other IO devices that the wireless communication adapter/dongle 330 or the information handling system 300 may use to access stored information identifying such default communications metrics. For example, the connection request 310 may include a standard data packet transmission rate (e.g., 80 Kilobits per second (Kbps)), or standard data packet transmission length (e.g., 23 bytes or 184 bits) for the mouse 380 or other IO devices. As another example, the connection request 310 may include identification for the mouse 380 or other IO devices that is associated with a profile stored at the wireless communication adapter/dongle 330 or the information handling system 300 providing such standard data packet transmission rate or standard data packet transmission length. In still other embodiments, the connection request 310 may include identification for the mouse 380 or other IO devices that is associated with a performance policy for the wireless IO device identifying one or more wireless IO device prioritized performance metrics identified by a user of the information handling system or a developer of a software application as impacting performance of one or more software applications executing at the information handling system. These software application specific wireless IO device prioritized performance metrics may also be identified within such performance policies for the wireless IO device 380, as determined by execution of code instructions of the software application performance-specific IO device wireless communication packet polling and reception system of embodiments herein.

Upon success of the connection requested, the wireless communication adapter/dongle 330 or the information handling system 300 may switch to a transmit (TX) mode. The controller of the wireless communication adapter/dongle 330 or the information handling system 300 integrated wireless radio system executing code instructions of the software application performance-specific IO device wireless communication packet polling and reception system in an embodiment may generate an initial polling packet 320 that instructs each of the wireless IO devices (e.g., 380) paired with the wireless communication adapter/dongle 330 or the information handling system 300 to transmit a plurality of data packets of a selected, specified number and length suitable for the executing software application and at specified time slots during a first data packet communication frame between the wireless communication adapter/dongle 330 or the information handling system 300 and each of the paired wireless IO devices (e.g., 380). A controller for the wireless communication adapter/dongle 330 or the wireless radio system of an information handling system 300 may identify one or more software applications currently executing at the information handling system 300 and a performance policy for the wireless IO device 380 that includes wireless IO device prioritized performance metrics for the one or more software applications receiving data from a coupled wireless IO device 380.

As described herein, this orchestration of data packets transmitted from one or more wireless IO devices (e.g., mouse 380) to the wireless dongle 330 or wireless radio system of the information handling system 300 executing code instructions of the software application performance-specific IO device wireless communication packet polling and reception system presents an opportunity to tailor the selected number of packets and selected packet lengths identified within polling packets (e.g., 320) to those suitable for high performance of one or more software applications executing at the information handling system 300. For example, in existing systems that only allow for transmission of data packets limited to 8 bytes, the data packet report rate and the wireless communication adapter/dongle report rate may be equivalent to one another and may be limited as such. This may be the case because each data packet being limited to 8 bytes further limits each data packet to carrying a single pair of coordinates or positional information for a wireless mouse. However, the orchestration of data packets transmitted from one or more wireless IO devices 380 to the wireless communication adapter/dongle 330 or wireless radio system of the information handling system 300 executing code instructions of the software application performance-specific IO device wireless communication packet polling and reception system allows for the transmission of data packets having more than 8 bytes, such as 16 bytes or 32 bytes and may allow a selected number of packets in response to a polling packet. Thus, each data packet may include more than one pair of coordinates or positional information of the wireless mouse 380. This may increase the wireless communication adapter/dongle report rate (e.g., speed at which a wireless mouse 380 transmits each positional measurement) without increasing the data packet transmission rate (e.g., speed at which each data packet is transmitted). This allows for fine-tuning of the wireless IO device data packet number and data packet length to accommodate wireless IO device prioritized performance metrics for the wireless IO mouse 380 to meet priority requirements for specific software applications executing at the information handling system 300.

Such performance may be gauged according to one or more wireless IO device prioritized performance metrics stored within one or more performance policies for the wireless IO device (e.g., mouse 380) at the wireless communication adapter/dongle 330 or the wireless communications radio system for the information handling system 300. For example, some software applications may be associated with a developer-specified or user-specified highest priority wireless IO device prioritized performance metric for low latency between transmission of a first data packet (e.g., 350) within consecutive data packet communication frames (e.g., following the updated polling packet 370). As another example, some software applications may be associated with a developer-specified or user-specified highest priority wireless IO device prioritized performance metric for a high data packet transmission rate identifying a speed at which data packets may be received at the wireless communication adapter/dongle 330 or a wireless radio system of the information handling system 300. As yet another example, some software applications may be associated with a developer-specified or user-specified highest priority wireless IO device prioritized performance metric for a high speed at which a wireless mouse 380 transmits each positional measurement of the mouse 380 to the wireless dongle 330 or wireless radio system of the information handling system 300 also referred to as a wireless communication adapter/dongle report rate or a wireless communication radio system report rate.

In some cases, developers or users may prioritize one of these wireless IO device prioritized performance metrics (e.g., low inter-frame latency, high data packet transmission rate, or high wireless communication adapter/dongle report rate) over the other. For example, gaming software applications may prioritize a high wireless communication adapter/dongle report rate over low inter-frame latency or high data packet transmission rate. In other cases, for other types of software applications, the opposite may be true. For example, developers or users of computer graphics generation applications may prioritize a low inter-frame latency over a high wireless communication adapter/dongle report rate or high data packet transmission rate. As another example, a software update application may prioritize a high data packet transmission rate over a high wireless communication adapter/dongle report rate or a low inter-frame latency.

In still other cases, the developer or the user may provide one or more of a maximum inter-frame latency threshold, a minimum data packet transmission rate threshold, or a minimum dongle report rate threshold to ensure user satisfaction during execution of the software application and ensure reliability of received data from the wireless IO device 380 even while another wireless IO device prioritized performance metric may be prioritized. Each of these wireless IO device prioritized performance metrics and applicable threshold values (e.g., maximum inter-frame latency threshold, minimum data packet transmission rate threshold, or minimum dongle report rate threshold) may be stored in a performance policy for the wireless IO device (e.g., 380) and may be matched with requirements for executing software applications.

Upon pairing of a wireless IO device 380 with the wireless communication adapter/dongle 330 or wireless radio system of the information handling system 300 in an embodiment, a controller for the wireless communication adapter/dongle 330 or wireless radio system of the information handling system 300 may execute code instructions of the software application performance-specific IO device wireless communication packet polling and reception system to identify one or more software applications currently executing at the information handling system 300 with IO device wireless prioritized performance metrics that are stored within the performance policy for the paired wireless IO device 380. In an embodiment, the performance policy for the wireless IO device 380 may identify one or more wireless IO device prioritized performance metrics and the identification of the executing software application may determine priority for one over the other, if applicable, based on the identified software application currently executing at the information handling system 300.

A controller for the wireless communication adapter/dongle 330 or wireless communication radio system for the information handling system 300 in an embodiment may access an estimated wireless IO device data packet communication performance table stored in firmware for the controller to identify a wireless IO device application suited data packet number and a wireless IO device application suited data packet length that is estimated to meet the software application specific wireless IO device prioritized performance metrics identified within the performance policy for the paired wireless IO device 380. Each combination of a wireless IO device application suited data packet number and a wireless IO device application suited data packet length may be associated with an estimated inter-frame latency value, an estimated dongle report rate, and an estimated data packet transmission rate. In addition, each combination of a wireless IO device application suited data packet number and a wireless IO device application suited data packet length may be referred to herein as a data packet communication frame profile. For example, the estimated wireless IO device data packet communication performance table given directly below may provide estimated values for wireless communication adapter/dongle report rate, estimated wireless IO device data packet transmission rate value, and latency between transmission of the first packet within consecutive data packet communication frames (e.g., inter-frame latency) for the mouse 380 based on various combinations of wireless IO device data packet number and data packet length (e.g., data packet communication frame profiles) in one embodiment:

TABLE 1

ESTIMATED WIRELESS IO DEVICE DATA PACKET COMMUNICATION PERFORMANCE TABLE

| Data packet communication frame profile: Wireless IO device Data Packet Number (N) and Wireless IO Device Data Packet Length (M) | Estimated Wireless IO Device Data Packet Transmission Rate Value | Estimated Inter-Frame Latency Value | Estimated Dongle Report Rate Value (Positional Measurements Received Per Second) |
|---|---|---|---|
| N = 1<br>M = 8 bytes | 4,000 Hz | 250 μs | 4,000 |
| N = 2<br>M = 8 bytes | 5,300 Hz | 370 μs | 5,300 |
| N = 3<br>M = 8 bytes | 6,060 Hz | 486 μs | 6,060 |
| N = 4<br>M = 8 bytes | 6,300 Hz | 610 μs | 6,300 |
| N = 1<br>M = 16 bytes | 3,500 Hz | 280 μs | 7,000 |
| N = 2<br>M = 16 bytes | 4,500 Hz | 435 μs | 8,000+ |
| N = 3<br>M = 16 bytes | 5,050 Hz | 585 μs | 8,000+ |
| N = 4<br>M = 16 bytes | 5,200 Hz | 750 μs | 8,000+ |

The estimated inter-frame latency values, estimated wireless IO device data packet transmission rate, and estimated dongle report rate values shown in the estimated wireless IO device data packet communication performance table above are but one example and may be determined in some embodiments based on experimental testing of communications between the wireless mouse 380 and the wireless communication adapter/dongle 330 or the wireless radio system of the information handling system 300, for example. The estimated wireless IO device data packet communication performance table may be stored in flash memory or other memory and sued with firmware for the controller of the wireless communication adapter/dongle 330 or the wireless radio system for the information handling system 300 in an embodiment. As shown in the estimated wireless IO device data packet communication performance table, increasing the wireless IO device data packet number (e.g., number of data packets transmitted within each data packet communication frame (e.g., 340) in an embodiment may generally increase the estimated inter-frame latency value. As also shown in the estimated wireless IO device data packet communication performance table, increasing the wireless IO device data packet length or wireless IO device data packet number may generally result in a higher estimated dongle report rate value. In some cases, the estimated inter-frame latency value or the estimated dongle report rate value may be constricted by limitations on hardware operably connected to the wireless communication adapter/dongle 330 or the wireless radio system of the information handling system 300. For example, the estimated dongle report rate value associated with wireless IO device data packet length of 16 bytes and wireless IO device data packet numbers above one may be limited to 8,000 positional measurements per second (Hz) due to constricted performance of the Universal Serial Bus (USB) connecting the dongle 330 or the wireless radio system to the information handling system 300. Thus, as the capabilities of the USB standards increase, so too may the estimated dongle report rate values within the estimated wireless IO device data packet communication performance table, depending on the varying payload counts or packet lengths used in data responses to a polling packet.

The controller for the wireless communication adapter/dongle 330 or the wireless radio system of the information handling system 300 in an embodiment may access the estimated wireless IO device data packet communication performance table and any performance policies for the wireless IO device 380 to determine the wireless IO device application suited data packet number and wireless IO device application suited data packet length best suited for high performance of the wireless IO device 380 as required for execution of an identified software application at the information handling system 300. This determination may be made in an embodiment based on a prioritization of one performance metric (e.g., low inter-frame latency, high wireless IO device data packet transmission rate, or high wireless communication adapter/dongle report rate) over another during execution of the specifically identified software application currently executing at the information handling system 300.

For example, a software application such as a first-person shooter gaming application may prioritize high wireless communication adapter/dongle report rate over low inter-frame latency or wireless IO device data packet transmission rate in an embodiment. As another example, another software application, such as computer graphics generation application may prioritize low inter-frame latency over high wireless communication adapter/dongle report rate or high wireless IO device data packet transfer rate. In still another example embodiment, another software application, such as a software update application may prioritize high wireless IO device data packet transfer rate over low inter-frame latency or high wireless communication adapter/dongle report rate.

As described directly above, adjusting the wireless IO device data packet number or length to tailor one of these wireless IO device prioritized performance metrics (e.g., inter-frame latency) for high performance of an executing software application may cause a corresponding decrease in suitability of another prioritized performance metric (e.g., dongle report rate) for execution of the software application. For example, increasing the wireless IO device data packet number in an embodiment may increase the wireless IO device data packet transmission rate and the wireless communication adapter/dongle report rate which may be well suited for execution of the software application, but may also increase the inter-frame latency, which may be ill-suited for execution of the software application, as shown in the estimated wireless IO device data packet communication performance table. Thus, these wireless IO device prioritized performance metrics (e.g., low or minimized inter-frame latency, high or maximized wireless IO device data packet transmission rate, and high or maximized dongle report rate) may be associated with competing needs. The controller for the wireless communication adapter/dongle 330 or the wireless radio system of the information handling system 300 in an embodiment may reference the performance policy for the specific wireless IO device 380 to determine which of these performance metrics is prioritized over the other in order to choose a wireless IO device application suited data packet number and length tailored specifically to the currently executing software application and its requirements for suitable performance.

For example, in an embodiment in which the IO device prioritized performance metric of interest is a low inter-frame latency, the controller for the wireless communication adapter/dongle or wireless radio system for an information handling system executing code instructions of the software application performance-specific IO device wireless communication packet polling and reception system may identify a data packet communication frame profile that selects a data packet number of one and a data packet length of 8 Bytes as a potential candidate profile best suited for transceiving of data packets between the wireless IO device 380 and the wireless communications dongle 330 during execution of the identified software application (e.g., computer graphics generation application). Such a data packet communication frame profile may be associated with a lowest possible inter-frame latency of 250 µs, within the estimated wireless IO device data packet communication performance table (Table 1), for example.

As another example, in an embodiment in which the IO device prioritized performance metric of interest is a high dongle report rate, the controller for the wireless communication adapter/dongle or wireless radio system for an information handling system executing code instructions of the software application performance-specific IO device wireless communication packet polling and reception system may identify a data packet communication frame profile that selects a data packet number of two, three, or four and a data packet length of 16 Bytes as potential candidate profiles best suited for transceiving of data packets between the wireless IO device 380 and the wireless communications dongle 330 during execution of the identified software application (e.g., gaming application). Such data packet communication frame profiles may be associated with a highest possible dongle report rate of 8,000 Hz within the estimated wireless IO device data packet communication performance table, for example.

Selection of a data packet communication frame profile that selects a data packet number greater than one in an embodiment may also provide the added benefit of more reliable throughput of those data packets in a noisy radio frequency (RF) environment. For example, in such a noisy RF environment, the controller for the wireless communication adapter/dongle 330 in an embodiment may need to increase power supplied to the wireless radio of the wireless communication adapter/dongle 330 in order to generate a stronger signal to overcome the noisy environment. As the wireless radio reaches its highest power saturation, the throughput of data packets transceived between the wireless IO device 380 and the wireless communication adapter/dongle 330 may plateau, causing the useful range (e.g., distance between the wireless communication adapter/dongle 330 and the wireless IO device 380) to also plateau or decrease. In order to overcome this power saturation limitation in such a noisy environment, the controller for the wireless communication adapter/dongle 330 in an embodiment may select a data packet number greater than one in order to provide more reliable throughput of data packets without approaching the power saturation for the wireless radio system.

In still another example, in an embodiment in which the IO device prioritized performance metric of interest is a high data packet transmission rate, the controller for the wireless communication adapter/dongle or wireless radio system for an information handling system executing code instructions of the software application performance-specific IO device wireless communication packet polling and reception system may identify a data packet communication frame profile that selects a data packet number of four and a data packet length of 8 Bytes as a potential candidate profile best suited for transceiving of data packets between the wireless IO device 380 and the wireless communications dongle 330 during execution of the identified software application (e.g., software update application). Such data packet communication frame profiles may be associated with a highest possible data packet transmission rate of 6,300 Hz within the estimated wireless IO device data packet communication performance table, for example.

The controller for the wireless communication adapter/dongle 330 or wireless radio system for an information handling system 300 executing code instructions of the software application performance-specific IO device wireless communication packet polling and reception system in an embodiment may determine whether more than one potential candidate profile has been identified as suitable for transceiving of data packets between the wireless IO device 380 and the wireless communications dongle 330 during execution of the identified software application. For example, in an embodiment in which the IO device prioritized performance metric of interest is a low inter-frame latency, a single data packet communication frame profile that selects a data packet number of one and a data packet length of 8 Bytes may have been identified as a potential candidate profile best suited for transceiving of data packets between the wireless IO device 380 and the wireless communications dongle 330 during execution of the identified software application (e.g., computer graphics generation application). As another example, in an embodiment in which the IO device prioritized performance metric of interest is a high data packet transmission rate, a single data packet communication frame profile that selects a data packet number of four and a data packet length of 8 Bytes may have been identified as a potential candidate profile best suited for transceiving of data packets between the wireless IO device 380 and the wireless communications dongle 330 during execution of the identified software application (e.g., software update application).

If a single potential candidate data packet communication frame profile has been identified, such as in the embodiments described directly above, this single data packet communication frame profile may be used to select the wireless IO device application suited data packet number and the wireless IO device application suited data packet length. For example, in an embodiment in which the IO device prioritized performance metric of interest is a low inter-frame latency, the wireless IO device application suited data packet number of one may be selected and the wireless IO device application suited data packet length of 8 Bytes may be selected for transceiving of data packets between the wireless IO device 380 and the wireless communications dongle 330 during execution of the identified software application (e.g., computer graphics generation application). As another example, in an embodiment in which the IO device prioritized performance metric of interest is a high data packet transmission rate, the wireless IO device application suited data packet number of four may be selected and the wireless IO device application suited data packet length of 8 Bytes may be selected for transceiving of data packets between the wireless IO device 380 and the wireless communications dongle 330 during execution of the identified software application (e.g., computer graphics generation application).

If more than one potential candidate data packet communication frame profile has been identified, there may be a need to narrow down the potential candidates to a single data packet communication frame profile. For example, in an embodiment in which the IO device prioritized performance metric of interest is a high dongle report rate, a plurality of data packet communication frame profiles that select a data packet number of two, three, or four and a data packet length of 16 Bytes may have been identified as potential candidate profiles best suited for transceiving of data packets between the wireless IO device 380 and the wireless communications dongle 330 during execution of the identified software application (e.g., gaming application). In such a case, the controller for the wireless communication adapter/dongle 330 or wireless radio system for an information handling system 300 executing code instructions of the software application performance-specific IO device wireless communication packet polling and reception system may refer to the wireless IO device 380 performance policy to determine if the user or developer of the software application determined to be currently executing at the information handling system 300 has identified a second wireless IO device prioritized performance metric (e.g., one having a lower priority, but still identified as impacting performance of the currently executing software application). If no other wireless IO device prioritized performance metrics are associated with the identified software application, the controller for the wireless communication adapter/dongle 330 or wireless radio system for an information handling system 300 executing code instructions of the software application performance-specific IO device wireless communication packet polling and reception system in an embodiment may select the wireless IO device application suited packet number and wireless IO device application suited packet length from any of the potential candidate data packet communication frame profiles identified above.

In some embodiments, other wireless IO device prioritized performance metrics may also be associated with the identified software application. For example, in an embodiment in which high dongle report rate was identified a highest prioritized wireless IO device prioritized performance metric, a second wireless IO device prioritized performance metric for the identified software application may be identified by a user or developer of the identified software application as impacting performance of the software application, although having a lower priority than the high dongle report rate. In one such example embodiment, a low inter-frame latency may be given as such a second wireless IO device prioritized performance metric for the identified software application. In such an example embodiment, the controller for the wireless communication adapter/dongle 330 or wireless radio system for an information handling system 300 executing code instructions of the software application performance-specific IO device wireless communication packet polling and reception system may select a wireless IO device application suited data packet number of two and a wireless IO device application suited data packet length of sixteen Bytes, associated with a lowest inter-frame latency of 435 µs (in comparison to other candidate data packet communication frame profiles having a dongle report rate of 8,000 Hz) as best suited for transceiving of data packets between the wireless IO device 380 and the wireless communications dongle 330 during execution of the identified software application.

In another such example embodiment, a high data packet transmission rate may be given as such a second wireless IO device prioritized performance metric for the identified software application. In such an example embodiment, the controller for the wireless communication adapter/dongle 330 or wireless radio system for an information handling system 300 executing code instructions of the software application performance-specific IO device wireless communication packet polling and reception system may select a wireless IO device application suited data packet number of four and a wireless IO device application suited data packet length of sixteen Bytes, associated with a highest data packet transmission rate of 5,200 Hz (in comparison to other candidate data packet communication frame profiles having a dongle report rate of 8,000 Hz) as best suited for transceiving of data packets between the wireless IO device 380 and the wireless communications dongle 330 during execution of the identified software application.

In some embodiments, the controller for the wireless communication adapter/dongle 330 or the wireless radio system of the information handling system 300 in an embodiment may reference the performance policy for the specific wireless IO device 380 to identify any minimum or maximum thresholds for the wireless IO device prioritized performance metrics (e.g., inter-frame latency, wireless IO device data packet transmission rate, or wireless communication adapter/dongle report rate). For example, the controller for the wireless communication adapter/dongle 330 or the wireless radio system of the information handling system 300 in an embodiment may reference the performance policy for the specific wireless IO device 380 to identify a maximum inter-frame latency threshold of 500 µs or 600 µs in various embodiments that may be tolerable. As another example, the controller for the wireless communication adapter/dongle 330 or the wireless radio system of the information handling system 300 in an embodiment may reference the performance policy for the specific wireless IO device 380 to identify a minimum data packet transmission rate threshold of 4,000 Hz or 5,000 Hz that may be required by specification in various embodiments. In still another example, the controller for the wireless communication adapter/dongle 330 or the wireless radio system of the information handling system 300 in an embodiment may reference the performance policy for the specific wireless IO device 380 to identify a minimum dongle report rate threshold of 5,000 Hz, 6,000 Hz, or 8,000 Hz, as required by specification or is required in various embodiments.

The controller for the wireless communication adapter/dongle 330 or the wireless radio system of the information handling system 300 may execute code instructions of the software application performance-specific IO device wireless communication packet polling and reception system to determine a wireless IO device application suited data packet number and wireless IO device application suited data packet length based on these minimum and maximum threshold values in some embodiments. For example, in some embodiments, the performance policy for the wireless mouse 380 may prioritize low inter-frame latency over high wireless communication adapter/dongle report rate or high wireless IO device data packet transmission rate. In one such example embodiment, the performance policy for the wireless mouse 380 may also identify a minimum dongle report rate threshold of 5,000 Hz and a minimum data packet transmission rate threshold of 5,000 Hz. In such a case, the controller for the wireless communication adapter/dongle 330 or the wireless radio system of the information handling system 300 executing code instructions of the software application performance-specific IO device wireless communication packet polling and reception system may access the estimated wireless IO device data packet communication performance table above to identify as best suited for execution of a specific software application the combination of wireless IO data packet number (N) and wireless IO data packet length (M) with a minimum packet number that is capable of meeting the minimum dongle report rate threshold and the minimum data packet transmission rate threshold as IO device wireless prioritized performance metrics for an executing software application. More specifically, the controller for the wireless communication adapter/dongle 330 or the wireless radio system of the information handling system 300 executing code instructions of the software application performance-specific IO device wireless communication packet polling and reception system may access the estimated wireless IO device data packet communication performance table above to identify a wireless IO device application suited data packet number of 2, and a wireless IO device application suited data packet length of 8 bytes, to give an estimated data packet transmission rate of 5,300 Hz (e.g., exceeding the minimum data packet transmission rate threshold of 5,000 Hz) and an estimated dongle report rate of 5,300 (e.g., exceeding the minimum dongle report rate threshold of 5,000 Hz) in one example embodiment. This may yield an estimated inter-frame latency value of 380 µs in an embodiment.

In another example embodiment, in which the performance policy for the wireless mouse 380 may prioritize low inter-frame latency over high wireless communication adapter/dongle report rate or high wireless IO device data packet transmission rate as a wireless IO device prioritized performance metric for a detected, executing software application, the performance policy for the wireless mouse 380 may also identify a minimum dongle report rate threshold of 6,000 Hz and a minimum data packet transmission rate threshold of 5,000 Hz. In such a case, the controller for the wireless communication adapter/dongle 330 or the wireless radio system of the information handling system 300 executing code instructions of the software application performance-specific IO device wireless communication packet polling and reception system may access the estimated wireless IO device data packet communication performance table above to identify a wireless IO device application suited data packet number of 3, and a wireless IO device application suited data packet length of 16 bytes, to give an estimated data packet transmission rate of 5,050 Hz (e.g., exceeding the minimum data packet transmission rate threshold of 5,000 Hz) and an estimated dongle report rate of 8,000 (e.g., exceeding the minimum dongle report rate threshold of 6,000 Hz). This may yield an estimated inter-frame latency value of 585 µs in an embodiment as meeting the wireless IO device prioritized performance metric for a detected, executing software application.

As another example embodiment, the performance policy for the wireless mouse 380 may prioritize high wireless communication adapter/dongle report rate over low inter-frame latency or high wireless IO device data packet transmission rate as a wireless IO device prioritized performance metric for a detected, executing software application. In one such example embodiment, the performance policy for the wireless mouse 380 may also identify a maximum inter-frame latency threshold of 500 µs and a minimum data packet transmission rate threshold of 4,000 Hz. In such a case, the controller for the wireless communication adapter/dongle 330 or the wireless radio system of the information handling system 300 executing code instructions of the software application performance-specific IO device wireless communication packet polling and reception system may access the estimated wireless IO device data packet communication performance table above to identify as best suited for execution of a specific software application the combination of wireless IO data packet number (N) and wireless IO data packet length (M) with a maximum packet length that is capable of meeting the maximum inter-frame latency threshold and the minimum data packet transmission rate threshold. More specifically, the controller for the wireless communication adapter/dongle 330 or the wireless radio system of the information handling system 300 executing code instructions of the software application performance-specific IO device wireless communication packet polling and reception system may access the estimated wireless IO device data packet communication performance table (Table 1) above to identify a wireless IO device application suited data packet number of 2, and a wireless IO device application suited data packet length of 16 bytes, to give an estimated data packet transmission rate of 4,500 Hz (e.g., exceeding the minimum data packet transmission rate threshold of 4,000 Hz) and an estimated inter-frame latency value of 435 µs (e.g., below the maximum inter-frame latency threshold of 500 µs). This may yield an estimated dongle report rate of up to 8,000 Hz in an embodiment that meets the wireless IO device prioritized performance metrics for a detected software application.

Selection of a data packet communication frame profile that selects a data packet number greater than one in an embodiment may also provide the added benefit of more reliable throughput of those data packets in a noisy radio frequency (RF) environment. For example, in such a noisy RF environment, the controller for the wireless communication adapter/dongle 330 in an embodiment may need to increase power supplied to the wireless radio of the wireless communication adapter/dongle 330 in order to generate a stronger signal to overcome the noisy environment. As the wireless radio reaches its highest power saturation, the throughput of data packets transceived between the wireless IO device 380 and the wireless communication adapter/dongle 330 may plateau, causing the useful range (e.g., distance between the wireless communication adapter/dongle 330 and the wireless IO device 380) to also plateau or decrease. In order to overcome this power saturation limitation in such a noisy environment, the controller for the wireless communication adapter/dongle 330 in an embodiment may select a data packet number greater than one in order to provide more reliable throughput of data packets without approaching the power saturation for the wireless radio system.

In another example embodiment, in which the performance policy for the wireless mouse 380 may prioritize high wireless communication adapter/dongle report rate over low inter-frame latency or high wireless IO device data packet transmission rate, the performance policy for the wireless mouse 380 may also identify a maximum inter-frame latency threshold of 600 µs and a minimum data packet transmission rate threshold of 5,000 Hz as additional wireless IO device prioritized performance metrics for a detected, executing software application. In such a case, the controller for the wireless communication adapter/dongle 330 or the wireless radio system of the information handling system 300 executing code instructions of the software application performance-specific IO device wireless communication packet polling and reception system may access the estimated wireless IO device data packet communication performance table (Table 1) above to identify a wireless IO device application suited data packet number of 3, and a wireless IO device application suited data packet length of 16 bytes, to give an estimated data packet transmission rate of 5,050 Hz (e.g., exceeding the minimum data packet transmission rate threshold of 5,000 Hz) and an estimated inter-frame latency value of 585 µs (e.g., falling below the maximum inter-frame latency threshold of 600 µs). This may yield an estimated dongle report rate of up to 8,000 Hz in an embodiment, as suitable or required for an executing software application.

As yet another example, in some embodiments, the performance policy for the wireless mouse 380 may prioritize high wireless IO device data packet transmission rate over low inter-frame latency or high wireless communication adapter/dongle report rate as a wireless IO device prioritized performance metric for a detected, executing software application. In one such example embodiment, the performance policy for the wireless mouse 380 may also identify a maximum inter-frame latency threshold of 500 µs and a minimum dongle report rate threshold of 6,000 Hz as additional wireless IO device prioritized performance metrics to limit selection of a packet frame number of packets or packet length to preserve other baseline performance requirements. In such a case, the controller for the wireless communication adapter/dongle 330 or the wireless radio system of the information handling system 300 executing code instructions of the software application performance-specific IO device wireless communication packet polling and reception system may access the estimated wireless IO device data packet communication performance table (Table 1) above to identify as best suited for execution of a specific software application the combination of wireless IO data packet number (N) and wireless IO data packet length (M) with a maximum packet number that is capable of meeting the maximum inter-frame latency threshold and the minimum data packet transmission rate threshold. More specifically, the controller for the wireless communication adapter/dongle 330 or the wireless radio system of the information handling system 300 executing code instructions of the software application performance-specific IO device wireless communication packet polling and reception system may access the estimated wireless IO device data packet communication performance table above to identify a wireless IO device application suited data packet number of 3, and a wireless IO device application suited data packet length of 8 bytes, to give an estimated dongle report rate of 6,060 Hz (e.g., exceeding the minimum dongle report rate threshold of 6,000 Hz) and an estimated inter-frame latency value of 486 µs (e.g., exceeding the maximum inter-frame latency threshold of 500 µs). This may yield an estimated data packet transmission rate of up to 6,060 Hz in an embodiment to meet a suitable wireless IO device prioritized performance metric for a detected software application.

In another example embodiment, the performance policy for the wireless mouse 380 may prioritize high wireless communication adapter/dongle report rate over high wireless IO device data packet transmission rate and low inter-frame latency or high wireless communication adapter/dongle report rate. The performance policy for the wireless mouse 380 may also identify a maximum inter-frame latency threshold of 500 µs and a minimum dongle report rate threshold of 8,000 Hz as additional wireless IO device prioritized performance metrics to limit selection of a packet frame number of packets or packet length to preserve other baseline performance requirements. In such a case, the controller for the wireless communication adapter/dongle 330 or the wireless radio system of the information handling system 300 executing code instructions of the software application performance-specific IO device wireless communication packet polling and reception system may access the estimated wireless IO device data packet communication performance table above to identify a wireless IO device application suited data packet number of 2, and a wireless IO device application suited data packet length of 16 bytes, to give an estimated dongle report rate of up to 8,000 Hz (e.g., meeting the minimum dongle report rate threshold of 8,000 Hz) and an estimated inter-frame latency value of 435 µs (e.g., falling below the maximum inter-frame latency threshold of 500 µs). This may yield an estimated wireless communication dongle report rate of 8,000 Hz in an embodiment to meet a suitable wireless IO device prioritized performance metric for a detected software application. In such a way, the software application performance-specific IO device wireless communication packet polling and reception system may tailor the selected number of packets and selected packet lengths identified within these polling packets for high performance of one or more software applications executing at the information handling system.

The controller of the wireless communication adapter/dongle 330 or the information handling system 300 may instruct the wireless radio system to transmit an initial polling packet 320 containing the initial wireless IO device application suited data packet number, the initial wireless IO device application suited data packet length, and initial wireless IO device application suited data packet transmission time slots. This initial polling packet 320 in an embodiment may synchronize communication between the wireless communication adapter/dongle 330 or the information handling system 300 and the wireless IO device 380 for a data packet communication frame beginning at a selected time and having the selected duration (e.g., 0.000833 seconds). Upon transmission of the initial polling packet 320 in an embodiment, the controller for the wireless communication adapter/dongle 330 or the information handling system 300 may switch the wireless radio system into a receive mode to await the beginning of the data packet communication frame with the wireless IO device 380.

At the time specified within the initial polling packet 320 in an embodiment, the data packet communication frame 340 may begin with receipt of a first packet 350 responsive to the initial polling packet 320 from the wireless IO device 380. In an embodiment, the first packet 350 for the data packet communication frame 340 may adhere to the instructions received within the initial polling packet 320. For example, in an embodiment, the first packet 350 may have a selected length equivalent to the initial wireless IO device application suited data packet length of 16 Bytes suitable for a detected executing software application and may be delivered at the synchronized time designating the beginning of the data packet communication frame 340 within the first of the selected number (e.g., four as shown) of initial wireless IO device application suited data packet transmission time slots, as defined within the initial polling packet 320.

A microcontroller executing code instructions of the software application performance-specific IO device wireless communication packet polling and reception system at the wireless communication adapter/dongle 330 or the information handling system 300 may ensure that, during this data packet communication frame 340, the wireless radio system remains in a receive mode to receive data packets from the one or more paired wireless IO devices (e.g., 380) during the anticipated duration of the data packet communication frame 340. In other words, the controller of the wireless communication adapter/dongle 330 or the information handling system 300 may avoid any power loss, data rate transmission delay, or inadvertent data packet collision threat due to rapid switching between RX/TX modes during this data packet communication frame 340. During the data packet communication frame 340 in an embodiment, the wireless radio system of the wireless communication adapter/dongle 330 or the information handling system 300 may receive a plurality of data packets equivalent to the initial wireless IO device application suited data packet number (e.g., four) as defined within the initial polling packet 320 that is suited to the detected software application and wireless IO device prioritized performance metric for that software application.

For example, in one embodiment in which the initial polling packet 320 identified an initial, selected wireless IO device application suited data packet number of four, the Nth packet 360 received by the wireless radio system of the wireless communication adapter/dongle 330 or the information handling system 300 may be the fourth of four data packets transmitted during the data packet communication frame 340 from the wireless IO device 380 to the wireless communication adapter/dongle 330 or the information handling system 300. Each of the four data packets transmitted to the wireless communication adapter/dongle 330 or the information handling system 300 in an embodiment may also have the initial, selected wireless IO device application suited data packet length (e.g., 16 bytes) that is suited to the detected software application and wireless IO device prioritized performance metrics for that software application and may be transmitted at the designated initial wireless IO device application suited data packet transmission time slots identified within the initial polling packet 320.

As described herein, each data packet may comprise one or more pairs of positional coordinates for a mouse that is wireless IO device 380, depending on the initial, selected wireless IO device application suited data packet length suited to the detected software application wireless IO device prioritized performance metric. For example, each pair of positional coordinates for the mouse 380 may comprise 8 bytes, such that a data packet having an initial, selected wireless IO device application suited data packet length of 8 bytes includes only one pair of positional coordinates, while an initial, selected wireless IO device application suited data packet length of 16 bytes may include two or more pairs of positional coordinates for the mouse that is wireless IO device 380.

Following the data packet communication frame 340, the controller of the wireless communication adapter/dongle 330 or the information handling system 300 may switch the wireless radio system to a transmit mode for further synchronizing future data packet communication frames and also acknowledging receipt or missed packets from a previous data packet communication frame. The controller may execute code instructions of the software application performance-specific IO device wireless communication packet polling and reception system in an embodiment to generate and transmit an updated polling packet 370. In one embodiment, such an updated polling packet 370 may include an acknowledgement header (ACK) identifying the number (N) of packets received during the data packet communication frame 340. For example, in an embodiment in which the Nth packet 360 is the fourth of four packets allotted to the wireless IO device 380 for transmission within the data packet communication frame 340 within the initial polling packet 320, such an updated polling packet 370 may acknowledge receipt of four data packets.

The updated polling packet 370 in an embodiment may further include updated instructions for synchronizing transmission of data packets within a second, later data packet communication frame. For example, the updated polling packet 370 may, at the very least, provide an updated time for initiation of such a second, later data packet communication frame. In such an embodiment, the updated polling packet 370 may or may not further adjust one or more of the selected wireless IO device application suited data packet number, selected wireless IO device application suited data packet length, or the selected wireless IO device application suited data packet transmission time slots for the wireless IO device 380 to meet the wireless IO device prioritized performance metric for a detected software application that is currently executing. For example, in an embodiment, the updated polling packet 370 identifying an updated time for initiation of a second, later data packet communication frame may also provide an updated selected wireless IO device application suited data packet number equivalent to the initial selected wireless IO device application suited data packet number. In another example, in an embodiment, the updated polling packet 370 may also provide an updated selected wireless IO device application suited data packet length equivalent to the initial selected wireless IO device application suited data packet length. In still another example, in an embodiment, the updated polling packet 370 may also provide updated selected wireless IO device application suited data packet time slots having the same positions within the second data packet communication frame as the positions of the initial selected wireless IO device application suited data packet transmission time slots within the first data packet communication frame 340.

In other embodiments, one or more of these values for the updated selected wireless IO device application suited data packet number, updated selected wireless IO device application suited data packet length, or updated selected wireless IO device application suited data packet transmission time slots may be changed or adjusted from the values of the initial selected wireless IO device application suited data packet number, initial selected wireless IO device application suited data packet length, or initial selected wireless IO device application suited data packet transmission time slots given within the initial polling packet 320 by the wireless IO device (e.g., 380) to meet wireless IO device prioritized performance metrics for a new detected executing software application or changes in function of the executing software application.

Transmission of an initial polling packet 320 prior to a scheduled data packet communication frame 340 and transmission of an updated polling packet 370 following the scheduled data packet communication frame 340 for orchestrating an upcoming second data packet communication frame may minimize the number of acknowledgement packets transmitted from the wireless communication adapter/dongle 330 or information handling system 300 and minimize the frequency with which switches between TX mode and RX mode are required. In such a way, the software application performance-specific IO device wireless communication packet polling and reception system may decrease the frequency of ACK data packets transmitted, and the frequency of mode-switching described above with respect to existing systems. This may decrease power consumed by rapid mode-switching, reduce latency and improve overall user experience and wireless IO device (e.g., 380) performance and provide tailored performance based on detected executing software applications in various embodiments.

In a further aspect of an embodiment, the controller of the wireless communication adapter/dongle 330 or the information handling system 300 executing code instructions of the software application performance-specific IO device wireless communication packet polling and reception system in an embodiment may determine that the wireless IO device 380 has failed to transmit a number of data packets equivalent to the initial wireless IO device application suited data packet number within the initial polling packet 320. This may occur, for example, if the wireless IO device 380 powers down or enters sleep mode during the data packet communication frame 340 from lack of use. In such a scenario, the controller of the wireless communication adapter/dongle 330 or the information handling system 300 executing code instructions of the software application performance-specific IO device wireless communication packet polling and reception system in an embodiment may initiate a device responsiveness timer having a preset duration (e.g., two minutes, five minutes, ten minutes). If no further data packets are received from the wireless IO device 380 before the device responsiveness timer expires, this may indicate that the wireless IO device 380 has been powered down or entered a sleep mode. In such a case, the controller of the wireless communication adapter/dongle 330 or the information handling system 300 executing code instructions of the software application performance-specific IO device wireless communication packet polling and reception system in an embodiment may terminate the wireless link with the wireless IO device 380 and return to the RX mode to scan multiple frequencies for incoming requests from other wireless IO devices to pair with the wireless communication adapter/dongle 330 or the information handling system 300.

Figure 4:
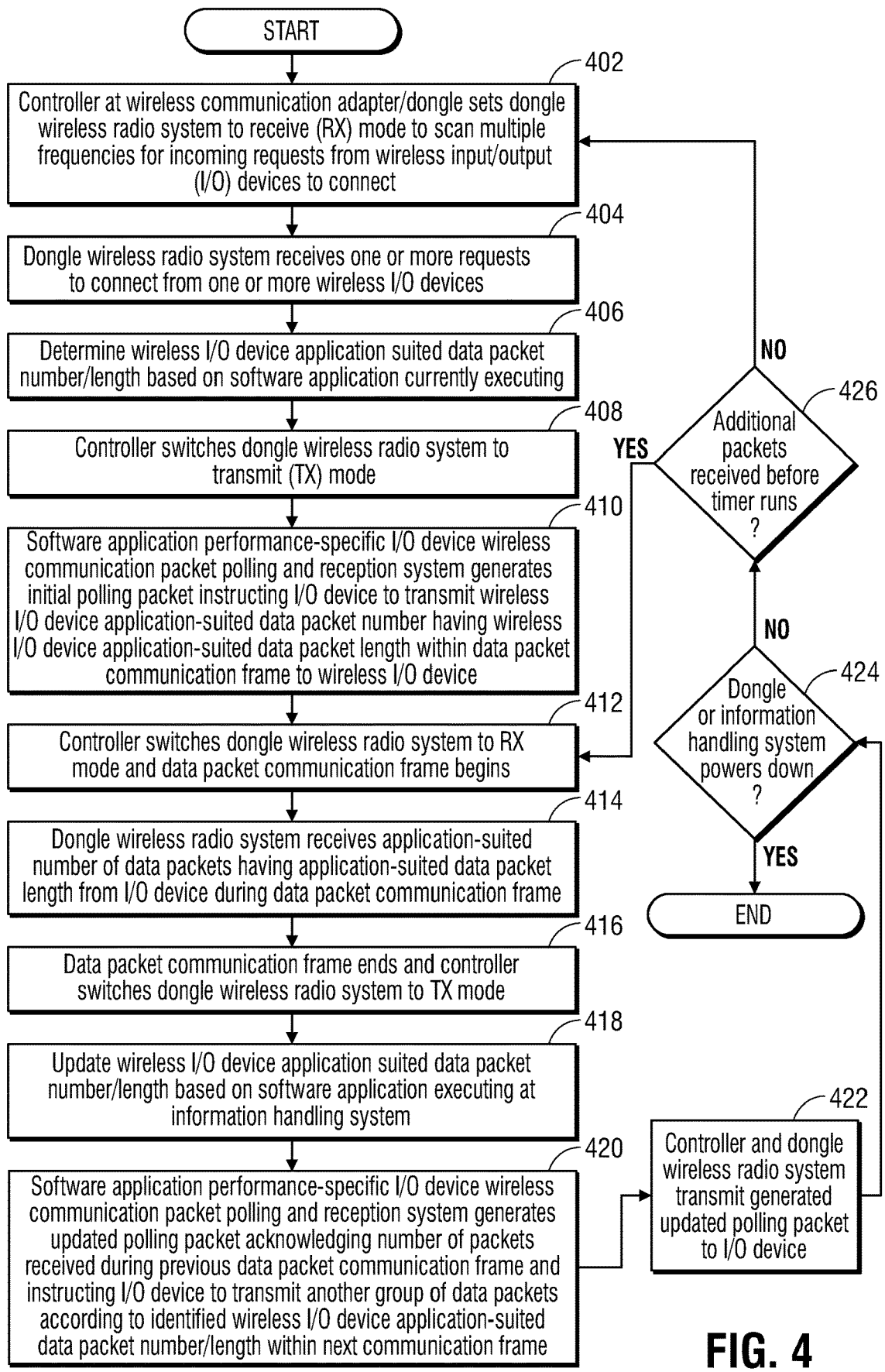
FIG. 4 is a flow diagram illustrating a method of orchestrating transmission of data packets from one or more wireless IO devices to a wireless radio adaptor or wireless communication adapter/dongle according to an embodiment of the present disclosure.

FIG. 4 is a flow diagram illustrating a method of orchestrating transmission of data packets from one or more wireless IO devices to a wireless communication adapter/dongle during a data packet communication frame to decrease power consumption, risk of data packet collision, and latency according to an embodiment of the present disclosure. As described herein, many manufacturers of wireless IO devices (e.g., mouse, keyboard, headset, virtual reality peripheral devices) for pairing wirelessly with an information handling system build these devices to provide the most basic or rudimentary communication capabilities, for example, those that may comply with the Bluetooth® Low Energy (BLE) communication standard. For example, many existing wireless IO devices are designed to communicate with a wireless communication adapter/dongle using a one reception/one transmission (1TX/1RX) format in which each time the wireless communication adapter/dongle polls a device then operates in receive mode to receive a data packet, it must then switch to transmit mode and transmit an ACK data packet back to the wireless IO device from which the initial data packet was received. The wireless communication adapter/dongle may then switch back to a receive mode to receive the next data packet from the wireless IO device. This process may be repeated each time a new data packet is generated at the wireless IO device, for example.

Each of these transmission/reception mode switches consumes power, causes delay and reduced throughput, and increases potential for collision between incoming wireless IO device data packets and outgoing ACK data packets. This may further cause the customer to experience reduced performance between their input via the wireless IO device (e.g., movement of the mouse) and the corresponding feedback displayed by the information handling system (e.g., movement of the cursor), or may cause the cursor to jump suddenly from one position to another (e.g., when the wireless mouse opts to skip resend of the missed packet). As a result, existing systems employing this 1TX/1RX approach may fail to meet customer needs for operational data throughput during execution of latency-sensitive software applications such as gaming applications or other high definition audio/visual applications. The software application performance-specific IO device wireless communication packet polling and reception system in an embodiment may orchestrate scheduled reception of a plurality of data packets, such as a selected number of data packets suitable for a detected, executing software application from each of a plurality of wireless IO devices between transmission of ACK data packets within a polling packet to each of those wireless IO devices to provide higher data throughputs and improved performance while also reducing energy waste.

At block 402, a controller for a wireless communication adapter/dongle or a network interface device for an information handling system may set a wireless radio system to a receive (RX) mode in an embodiment. While in this RX mode in an embodiment, the wireless radio system may scan multiple frequencies for incoming pairing requests from one or more wireless IO devices. For example, in an embodiment described with respect to FIG. 3, a wireless radio system of the wireless communication adapter/dongle 330 or the information handling system 300 may scan a plurality of frequencies at which wireless IO devices (e.g., 380) may be expected to transmit requests to connect with the dongle 330 or the information handling system 300.

The wireless radio system in an embodiment at block 404 may receive one or more requests to connect from one or more wireless IO devices. For example, while in this RX mode, the wireless radio system of the wireless communication adapter/dongle 330 or the information handling system 300 may receive a request to connect 310 with the wireless communication adapter/dongle 330 or the information handling system 300. This connection request 310 in some embodiments may include an identification of the model number or various default communication metrics for the mouse 380 or other identifying information for the mouse 380 that the wireless communication adapter/dongle 330 or the information handling system 300 may use to access stored information identifying such default communications metrics. For example, the connection request 310 may include identification for the mouse or other IO devices 380 that is associated with a performance policy for the wireless IO device identifying one or more wireless IO device prioritized performance metrics identified by a user or a developer of a software application as affecting performance of that software application detected as currently executing at the information handling system. These one or more wireless IO device prioritized performance metrics are identified within such performance policies as having such wireless IO device prioritized performance metrics for use with a coupled and operatively connected wireless IO device when an identified software application is executing. In additional embodiments, the performance policies for the wireless IO device may also include a maximum inter-frame latency value indicating a maximum tolerable time period between data packet communication frames, a minimum dongle report rate threshold defining a required minimum tolerable speed at which a wireless mouse transmits each positional measurement of the mouse to the wireless dongle or wireless radio system, or a minimum data packet transmission rate threshold to preserve a baseline level of wireless IO device performance for software applications identified.

At block 406, the controller of the wireless communication adapter/dongle or the information handling system in an embodiment may determine an initial selected wireless IO device application suited data packet number and an initial selected wireless IO device application suited data packet length for an upcoming data packet communication frame between the wireless IO device and the wireless communication adapter/dongle or information handling system suitable to meet requirements for the wireless IO device prioritized performance metrics for a detected software application executing on the information handling system. For example, the controller of the wireless communication adapter/dongle 330 or the information handling system 300 in an embodiment may determine an initial selected wireless IO device application suited data packet number of four and an initial selected wireless IO device application suited data packet length of 16 bytes for an upcoming data packet communication frame 340 between the wireless IO device 380 and the wireless communication adapter/dongle 330 or the information handling system 300 in one example embodiment.

The controller of the wireless communication adapter/dongle or the information handling system in an embodiment at block 408 may switch the wireless radio system to a transmit (TX) mode for transmission of an initial polling packet for synchronizing delivery of data packets between the wireless IO device and the wireless communication adapter/dongle or information handling system. For example, upon successful receipt of the connection requested at block 404 above, the wireless communication adapter/dongle 330 or the information handling system 300 may switch to a transmit (TX) mode.

At block 410, the controller of the wireless communication adapter/dongle or the information handling system executing code instructions of the software application performance-specific IO device wireless communication packet polling and reception system in an embodiment may generate an initial polling packet. For example, the controller of the wireless communication adapter/dongle 330 or the information handling system 300 executing code instructions of the software application performance-specific IO device wireless communication packet polling and reception system in an embodiment may generate an initial polling packet 320 that instructs each of the wireless IO devices (e.g., 380) paired with the wireless communication adapter/dongle 330 or the information handling system 300 to transmit a plurality of a selected number of data packets of a selected length and at selected time slots during a first data packet communication frame 340 between the wireless communication adapter/dongle 330 or the information handling system 300 and each of the paired wireless IO devices (e.g., 380) suitable to meet requirements for the wireless IO device prioritized performance metrics for a detected software application executing on the information handling system.

The controller of the wireless communication adapter/dongle 330 or the information handling system 300 executing code instructions of the software application performance-specific IO device wireless communication packet polling and reception system in an embodiment may determine an initial selected wireless IO device application suited data packet number (e.g., four), initial selected wireless IO device application suited data packet length (e.g., 16 bytes), or initial selected wireless IO device application suited data packet transmission time slots for receipt of data packets transmitted from the wireless IO device 380 based on identification of a currently executing software application at the information handling system having one or more wireless IO device prioritized performance metrics (e.g., low inter-frame latency, high dongle report rate, high data packet transmission rate), or threshold minimum or maximum values for these wireless IO device prioritized performance metrics which may be associated with that software application execution within performance policies for each of the one or more wireless IO devices to maintain baseline performance while prioritizing another wireless IO device prioritized performance metric or metrics.

For example, the controller of the wireless communication adapter/dongle 330 or the information handling system 300 executing code instructions of the software application performance-specific IO device wireless communication packet polling and reception system may determine an initial selected wireless IO device application suited data packet number of N=four, initial selected wireless IO device application suited data packet length of 16 bytes (B), or initial selected wireless IO device application suited data packet transmission time slots of N=4 time slots, with each time slot occurring every 0.000167 seconds (e.g., 167 μs) for receipt of data packets transmitted from the wireless IO device 380 within a data packet communication frame having a total length of 0.000833 seconds suitable to meet the requirements of the executing software application. This determination may be made in order to maximize a highest wireless IO device prioritized performance metric of wireless communication adapter/dongle report rate among the wireless IO device prioritized performance metrics associated with the software application currently detected as executing at the information handling system 300, for example. The controller of the wireless communication adapter/dongle 330 or the information handling system 300 may instruct the wireless radio system to transmit an initial polling packet 320 containing the initial selected wireless IO device application suited data packet number, the initial selected wireless IO device application suited data packet length, at initial selected wireless IO device application suited data packet transmission time slots to the wireless IO device or devices (e.g., 380). This initial polling packet 320 in an embodiment may synchronize communication between the wireless communication adapter/dongle 330 or the information handling system 300 and the wireless IO device 380 for a data packet communication frame beginning at a selected time and having the selected duration (e.g., 0.000833 seconds) and number of packets N(e.g., N=4) as coordinated at the software application performance-specific IO device wireless communication packet polling and reception agent at the wireless IO device 380.

The controller for the wireless communication adapter/dongle or the information handling system in an embodiment at block 412 may switch the wireless radio system to RX mode for receipt of a first data packet within a data packet communication frame. For example, in an embodiment described with respect to FIG. 3, upon transmission of the initial polling packet 320 in an embodiment, the controller for the wireless communication adapter/dongle 330 or the information handling system 300 may switch the wireless radio system into a receive mode to await the beginning of the data packet communication frame 340 with the wireless IO device 380. At the time specified within the initial polling packet 320 in an embodiment, the data packet communication frame 340 may begin with receipt of a first packet 350 responsive to the initial polling packet 320 from the wireless IO device 380. In an embodiment, the first packet 350 for the data packet communication frame 340 may adhere to the instructions received within the initial polling packet 320. For example, in an embodiment, the first packet 350 may have a length equivalent to the initial selected wireless IO device application suited data packet length of 16 bytes and may be delivered at the synchronized time designating the beginning of the data packet communication frame 340 within the first of four initial selected wireless IO device application suited data packet transmission time slots, as defined within the initial polling packet 320 and coordinated at the software application performance-specific IO device wireless communication packet polling and reception agent at the wireless IO device 380.

At block 414, the wireless radio system of the wireless communication adapter/dongle or information handling system in an embodiment may receive a plurality of data packets from one or more wireless IO devices during a first data packet communication frame. For example, during the data packet communication frame 340 in an embodiment, the wireless radio system of the wireless communication adapter/dongle 330 or the information handling system 300 may receive a plurality of data packets equivalent to the initial selected wireless IO device application suited data packet number N as defined within the initial polling packet 320 suitable to meet the wireless IO device prioritized performance metrics for the executing software application. More specifically, in an embodiment in which the initial polling packet 320 identified an initial selected wireless IO device application suited data packet number of N=four, the Nth packet 360 received by the wireless radio system of the wireless communication adapter/dongle 330 or the information handling system 300 may be the fourth of four data packets transmitted during the data packet communication frame 340 from the wireless IO device 380 to the wireless communication adapter/dongle 330 or the information handling system 300. Each of the four data packets transmitted to the wireless communication adapter/dongle 330 or the information handling system 300 in an embodiment may have the initial selected wireless IO device application suited data packet length (e.g., 16 bytes) and may be transmitted at the designated initial selected wireless IO device application suited data packet transmission time slots identified within the initial polling packet 320 to meet the wireless IO device prioritized performance metrics determined for the executing software application in the example embodiment. Any selected number of data packets or data packet length may be determined according to requirements of the executing software application for the wireless IO device as identified by a user or developer of the software application.

A microcontroller executing code instructions of the software application performance-specific IO device wireless communication packet polling and reception system at the wireless communication adapter/dongle 330 or the information handling system 300 may ensure that, during this data packet communication frame 340, the wireless radio system remains in a receive mode to receive data packets from the one or more paired wireless IO devices (e.g., 380). In other words, the controller of the wireless communication adapter/dongle 330 or the information handling system 300 may avoid any power loss or inadvertent data packet collision threat due to a reduction in rapid switching between RX/TX modes during this data packet communication frame 340.

The data packet communication frame orchestrated according to the initial polling packet transmitted at block 410 may end in an embodiment at block 416, and the controller for the wireless communication adapter/dongle or information handling system may switch the dongle wireless radio system to the TX mode. For example, in an embodiment described with reference to FIG. 3, following the data packet communication frame 340 and time or number of packets allocated for the same, the controller of the wireless communication adapter/dongle 330 or the information handling system 300 may switch the wireless radio system to a TX mode for orchestrating a future data packet communication frame.

At block 418, the controller for the wireless communication adapter/dongle or information handling system in an embodiment may execute code instructions of the software application performance-specific IO device wireless communication packet polling and reception system to update the wireless IO device application suited data packet number or wireless IO device application suited data packet length, based on software applications currently executing at the information handling system. If the same software application is executing at the information handling system with the same operating priorities, the selected number of data packets and the selected length of data packets may remain the same in the updated polling packet with ACK of previous data packet communication frame data. If the software application changes (e.g., a first software application ceases execution and a second software application begins execution), or the current executing software application changes operating priorities, the updated polling packet may change the selected number of data packets or the selected data packet length to meet new wireless IO device prioritized performance metrics. Moreover, in some embodiments, the phase of execution of the identified executing software application may change and when the phase of execution changes, the software application performance-specific IO device wireless communication packet polling and reception system may update the wireless IO device application suited data packet number or wireless IO device application suited data packet length based on the detected phase of execution of an identified software application in other embodiments.

The controller for the wireless communication adapter/dongle or information handling system in an embodiment at block 420 may generate an updated polling packet acknowledging the number of packets received during the previous data packet communication frame to each paired wireless IO device (e.g., N packets). The updated polling packet in an embodiment may further include instructions for the one or more paired wireless IO devices to transmit another designated selected number (e.g., N, N+1, N−1, etc.) of data packets at identified time slots with updated times within a second data packet communication frame to meet the wireless IO device prioritized performance metrics for a current or newly detected executing software application and its operating performance priorities from the operatively coupled wireless IO device. For example, the controller in an embodiment may execute code instructions of the software application performance-specific IO device wireless communication packet polling and reception system to generate an updated polling packet 370. In an embodiment, such an updated polling packet 370 may include an acknowledgement header (ACK) identifying the number (N) of packets received during the previous data packet communication frame 340. For example, in an embodiment in which the Nth packet 360 is the fourth of four packets allotted to the wireless IO device 380 for transmission within the data packet communication frame 340 within the initial polling packet 320, such an updated polling packet 370 may acknowledge receipt of four packets.

The updated polling packet 370 in an embodiment may further include updated instructions for synchronizing transmission of data packets within a second, later data packet communication frame. For example, the updated polling packet 370 may provide an updated time for initiation of such a second, later data packet communication frame for N packets again or may change to a new selected number of data packets or a new selected data packet length in accordance with embodiments herein.

Transmission of an initial polling packet 320 prior to a scheduled data packet communication frame 340 and transmission of an updated polling packet 370 following the scheduled data packet communication frame 340 for acknowledgement of received packets and orchestrating an upcoming second data packet communication frame may minimize the number of acknowledgement packets and polling packets transmitted from the wireless communication adapter/dongle 330 or information handling system 300 and minimize the frequency with which switches between TX mode and RX mode are required. In such a way, the software application performance-specific IO device wireless communication packet polling and reception system may decrease the frequency of ACK data packets transmitted and occupying airtime, and the frequency of mode-switching described above with respect to existing systems. This may further decrease power consumed by rapid mode-switching, decrease latency, and improve overall data throughput and user experience.

At block 422, the controller for the wireless communication adapter/dongle or information handling system in an embodiment may instruct the wireless radio system to transmit the updated polling packet generated at block 420 to one or more paired wireless IO devices. For example, in an embodiment described with respect to FIG. 3, the controller for the wireless communication adapter/dongle 330 or the information handling system 300 in an embodiment may execute code instructions of the software application performance-specific IO device wireless communication packet polling and reception system to instruct the wireless radio system to transmit an updated polling packet 370.

The controller of the wireless communication adapter/dongle or the information handling system in an embodiment at block 424 may determine whether the dongle or the information handling system has powered down. If the wireless communication adapter/dongle or the information handling system has powered down in an embodiment, there may be no need or no capability to switch the dongle wireless radio system to a RX mode for further communication with the IO device, and the method may then end. If the wireless communication adapter/dongle or the information handling system has not powered down in an embodiment, the method may proceed to block 426 to assess whether the linked IO device is still responsive (e.g., not powered down or in sleep mode) and capable of engaging in further data packet communication frames with the wireless communication adapter/dongle.

At block 426, in an embodiment in which the wireless communication adapter/dongle and information handling system remain active (e.g., not powered down), the controller of the wireless communication adapter/dongle or the information handling system may determine whether additional packets are received from the wireless IO device prior to expiration of a device responsiveness timer. For example, the controller of the wireless communication adapter/dongle 330 or the information handling system 300 executing code instructions of the software application performance-specific IO device wireless communication packet polling and reception system in an embodiment may initiate a device responsiveness timer having a preset duration (e.g., two minutes, five minutes, ten minutes). If no further data packets are received from the wireless IO device 380 before the device responsiveness timer expires, this may indicate that the wireless IO device 380 has been powered down or entered a sleep mode. If additional packets are received from the wireless IO device (e.g., 380) prior to expiration of the device responsive timer, this may indicate the wireless IO device is still active and the method may proceed to block 412 for transmission of more data packets by the wireless IO device (e.g., 380) during a new data packet communication frame. If no additional packets are received from the wireless IO device (e.g., 380) prior to expiration of the device responsiveness timer, the method may proceed back to 402 for scanning of multiple frequencies to receive requests from other wireless IO devices to connect with the wireless communication adapter/dongle or the information handling system. For example, the controller of the wireless communication adapter/dongle 330 or the information handling system 300 executing code instructions of the software application performance-specific IO device wireless communication packet polling and reception system in an embodiment may terminate the wireless link with the wireless IO device 380 and return to the RX mode to scan multiple frequencies for incoming requests from other wireless IO devices to pair with the wireless communication adapter/dongle 330 or the information handling system 300. By repeating the loop between blocks 402 and 426, the software application performance-specific IO device wireless communication packet polling and reception system may decrease the frequency of ACK data packets transmitted by the wireless communication adapter/dongle or information handling system, and the frequency of mode-switching described above with respect to existing systems. This may further decrease power consumed by rapid mode-switching, decrease latency, and improve overall wireless IO device throughput and user experience as tailored to a detected executing software application and its required wireless IO device prioritized performance metrics for operatively coupled wireless IO devices.

In an embodiment in which additional data packets are received from the wireless IO device either within the second data packet communication frame or prior to expiration of the device responsiveness timer, the controller of the wireless communication adapter/dongle or the information handling system executing code instructions of the software application performance-specific IO device wireless communication packet polling and reception system in an embodiment may switch the wireless radio system to RX mode and receive another plurality of data packets as instructed within the updated polling packet transmitted at block 422. For example, the controller of the wireless communication adapter/dongle 330 or the information handling system 300 executing code instructions of the software application performance-specific IO device wireless communication packet polling and reception system in an embodiment may switch the wireless radio system to RX mode and receive another plurality of data packets as instructed within the updated polling packet 370. In such a way, the software application performance-specific IO device wireless communication packet polling and reception system may decrease the frequency of ACK data packets transmitted, and the frequency of mode-switching described above with respect to existing systems. This may further decrease power consumed by rapid mode-switching and decrease latency and improve overall wireless IO device performance and user experience.

Figure 5:
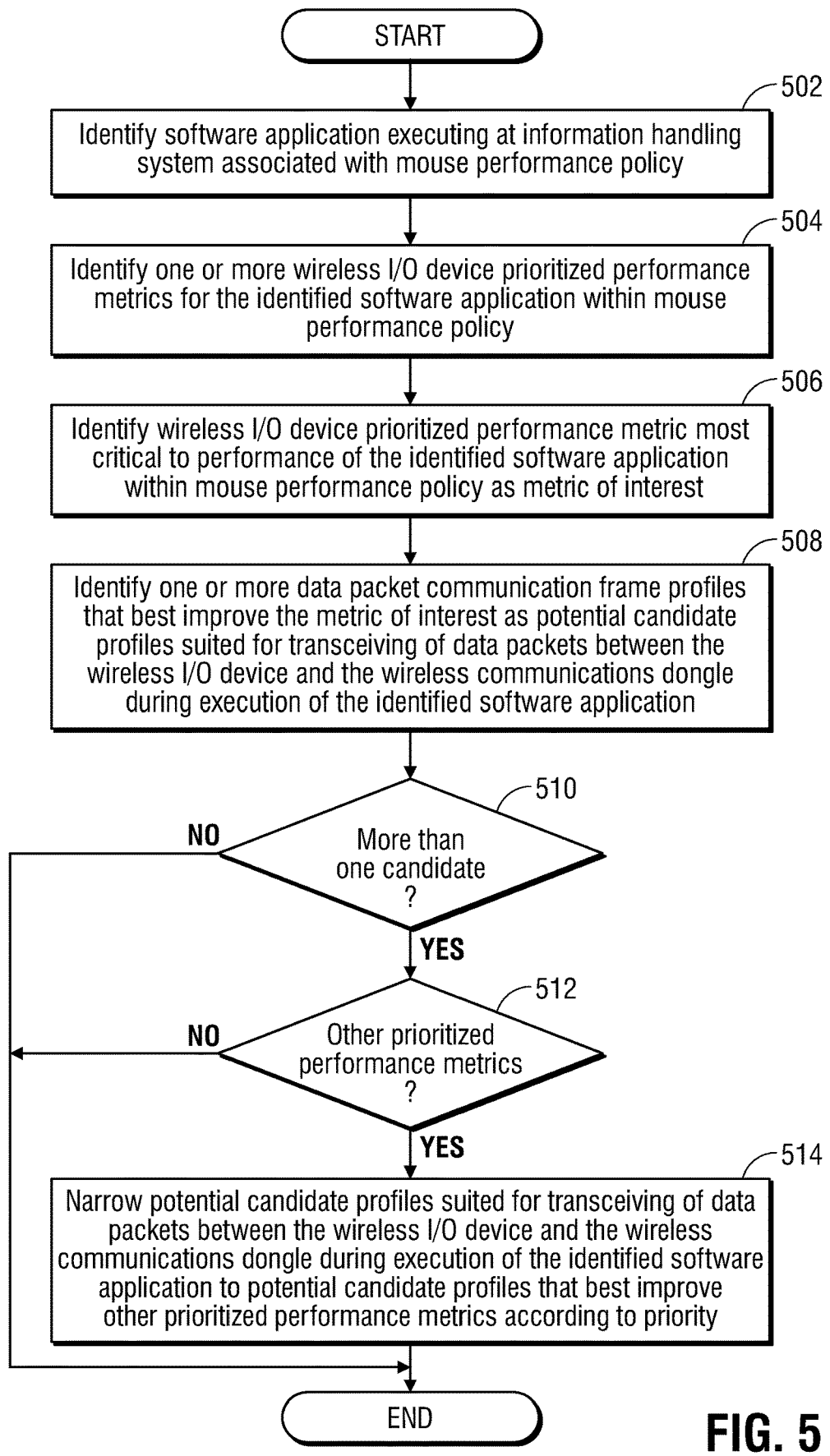
FIG. 5 is a flow diagram illustrating a method of determining wireless IO device and software application suited data packet number and length based on identification of a software application currently executing at an information handling system according to an embodiment of the present disclosure.

FIG. 5 is a flow diagram illustrating a method of determining wireless IO device application suited data packet number and length based on identification of a software application currently executing at an information handling system for orchestrating receipt of data packets within a data packet communication frame according to embodiments of the present disclosure. As described herein, a selected wireless IO device application suited data packet number and selected wireless IO device application suited data packet length in an embodiment may be selected based on identification of a currently executing software application at the information handling system, and one or more wireless IO device prioritized performance metrics (e.g., low inter-frame latency, high wireless IO device data packet transmission rate, or high dongle report rate). Threshold minimum or maximum values for these selected wireless IO device prioritized performance metrics may also be associated with that identified software application within performance policies for the wireless IO device to preserve baseline operational performance of a wireless IO device for an identified software application in some embodiments.

At block 502, a controller for the wireless communication adapter/dongle or wireless radio system for an information handling system executing code instructions of the software application performance-specific IO device wireless communication packet polling and reception system in an embodiment may identify a software application executing at an information handling system that is associated with a mouse or other wireless IO device performance policy. For example, in an embodiment described with reference to FIG. 3, a controller for the wireless communication adapter/dongle 330 or the wireless radio system of an information handling system 300 may identify one or more software applications currently executing at the information handling system 300 that have wireless IO device prioritized performance metrics identified within the performance policy for the wireless IO device 380. The orchestration of data packets transmitted from one or more wireless IO devices 380 to the wireless communication adapter/dongle 330 or wireless radio system of the information handling system 300 executing code instructions of the software application performance-specific IO device wireless communication packet polling and reception system allows for the transmission of data packets having more than 8 bytes, such as 16 bytes or 32 bytes in some embodiments. This allows for fine-tuning of the wireless IO device data packet number and length to accommodate wireless IO device prioritized performance metrics for the wireless IO mouse or other wireless IO devices 380 associated with specific software applications executing at the information handling system 300 according to embodiments herein.

The controller for the wireless communication adapter/dongle or wireless radio system for an information handling system executing code instructions of the software application performance-specific IO device wireless communication packet polling and reception system in an embodiment at block 504 may identify one or more wireless IO device prioritized performance metrics for the identified software application within a mouse or other wireless IO device performance policy. For example, the performance policy for the wireless mouse or other wireless IO devices 380 in an embodiment may further identify one or more wireless IO device prioritized performance metrics that may be prioritized based on current operations of the executing software application. These operations and wireless IO device prioritized performance metrics may change with changes in operation of the executing software application or with change of which software application is executing at the information handling system in some embodiments.

For example, some software applications may be associated with a developer-specified or user-specified wireless IO device prioritized performance metric for priority of a low latency between transmission of a first data packet (e.g., 350) within consecutive data packet communication frames (e.g., following the updated polling packet 370). As another example, some software applications may be associated with a developer-specified or user-specified wireless IO device prioritized performance metric for priority of a high data packet transmission rate identifying a speed at which data packets may be received at the wireless communication adapter/dongle 330 or a wireless radio system of the information handling system 300. As yet another example, some software applications may be associated with a developer-specified or user-specified wireless IO device prioritized performance metric for priority of a high speed or report rate at which a wireless mouse 380 transmits each positional measurement of the mouse 380 to the wireless dongle 330 or wireless radio system of the information handling system 300.

At block 506, the controller for the wireless communication adapter/dongle or wireless radio system for an information handling system executing code instructions of the software application performance-specific IO device wireless communication packet polling and reception system in an embodiment may identify a wireless IO device prioritized performance metric most applicable to performance of the identified software application within the mouse or other wireless IO device performance policy as a metric of interest. In some cases, developers or users may prioritize one of these wireless IO device prioritized performance metrics (e.g., low inter-frame latency, high data packet transmission rate, or high wireless communication adapter/dongle report rate) over the other or others. For example, gaming software applications may prioritize a high wireless communication adapter/dongle report rate over low inter-frame latency or high data packet transmission rate. In other cases, for other types of software applications, the opposite may be true. For example, developers or users of computer graphics generation applications may prioritize a low inter-frame latency over a high wireless communication adapter/dongle report rate or high data packet transmission rate. As another example, a software update application or a software application requiring high levels of data downloading may prioritize a high data packet transmission rate over a high wireless communication adapter/dongle report rate or a low inter-frame latency. Each of these wireless IO device prioritized performance metrics may be stored in a performance policy for the wireless IO device (e.g., 380) and may be matched with requirements for executing software applications, or event to specific execution phases of those software applications.

For example, some software applications may be associated with a developer-specified or user-specified highest priority wireless IO device prioritized performance metric for low latency between transmission of a first data packet (e.g., 350) within consecutive data packet communication frames (e.g., following the updated polling packet 370). In such an example embodiment, low latency may be identified as the IO device prioritized performance metric of interest.

As another example, some software applications may be associated with a developer-specified or user-specified highest priority wireless IO device prioritized performance metric for a high data packet transmission rate identifying a speed at which data packets may be received at the wireless communication adapter/dongle 330 or a wireless radio system of the information handling system 300. In such an example embodiment, high data packet transmission rate may be identified as the IO device prioritized performance metric of interest.

As yet another example, some software applications may be associated with a developer-specified or user-specified prioritized highest priority wireless IO device performance metric for a high speed at which a wireless mouse 380 transmits each positional measurement of the mouse 380 to the wireless dongle 330 or wireless radio system of the information handling system 300, which may be referred to herein as a "wireless communication adapter/dongle report rate," or a "wireless communication radio system report rate." In such an example embodiment, high dongle report rate may be identified as the IO device prioritized performance metric of interest.

The controller for the wireless communication adapter/dongle or wireless radio system for an information handling system executing code instructions of the software application performance-specific IO device wireless communication packet polling and reception system in an embodiment at block 508 may identify one or more data packet communication frame profiles that best improve the IO device prioritized performance metric of interest as potential candidate frame profiles suited for transceiving of data packets between the wireless IO device and the wireless communications dongle during execution of the identified software application. For example, a controller for the wireless communication adapter/dongle 330 or wireless communication radio system for the information handling system 300 in an embodiment may access an estimated wireless IO device data packet communication performance table stored in firmware for the controller to identify a wireless IO device application suited data packet number and a wireless IO device application suited data packet length that is a frame profile estimated to meet the software application specific wireless IO device prioritized performance metrics identified within the performance policy for the paired wireless IO device 380. Each combination of a wireless IO device application suited data packet number and a wireless IO device application suited data packet length may be associated with an estimated inter-frame latency value, an estimated dongle report rate, and an estimated data packet transmission rate. In addition, each combination of a wireless IO device application suited data packet number and a wireless IO device application suited data packet length may be referred to herein as a data packet communication frame profile or a frame profile.

For example, in an embodiment in which the IO device prioritized performance metric of interest is a low inter-frame latency, the controller for the wireless communication adapter/dongle or wireless radio system for an information handling system executing code instructions of the software application performance-specific IO device wireless communication packet polling and reception system may identify a data packet communication frame profile that selects a data packet number of one and a data packet length of 8 Bytes as a potential candidate profile best suited for transceiving of data packets between the wireless IO device 380 and the wireless communications dongle 330 during execution of the identified software application (e.g., computer graphics generation application). Such a data packet communication frame profile may be associated with a lowest possible inter-frame latency of 250 µs, within the estimated wireless IO device data packet communication performance table, for example.

As another example, in an embodiment in which the IO device prioritized performance metric of interest is a high dongle report rate, the controller for the wireless communication adapter/dongle or wireless radio system for an information handling system executing code instructions of the software application performance-specific IO device wireless communication packet polling and reception system may identify data packet communication frame profiles that selects a data packet number of two, three, or four and a data packet length of 16 Bytes as potential candidate profiles best suited for transceiving of data packets between the wireless IO device 380 and the wireless communications dongle 330 during execution of the identified software application (e.g., gaming application). Such data packet communication frame profiles may be associated with a highest possible dongle report rate of 8,000 Hz within the estimated wireless IO device data packet communication performance table, for example.

In still another example, in an embodiment in which the IO device prioritized performance metric of interest is a high data packet transmission rate, the controller for the wireless communication adapter/dongle or wireless radio system for an information handling system executing code instructions of the software application performance-specific IO device wireless communication packet polling and reception system may identify a data packet communication frame profile that selects a data packet number of four and a data packet length of 8 Bytes as a potential candidate profile best suited for transceiving of data packets between the wireless IO device 380 and the wireless communications dongle 330 during execution of the identified software application (e.g., software update application). Such data packet communication frame profiles may be associated with a highest possible data packet transmission rate of 6,300 Hz within the estimated wireless IO device data packet communication performance table, for example.

At block 510, the controller for the wireless communication adapter/dongle or wireless radio system for an information handling system executing code instructions of the software application performance-specific IO device wireless communication packet polling and reception system in an embodiment may determine whether more than one potential candidate frame profile has been identified at block 508 as suitable for transceiving of data packets between the wireless IO device and the wireless communications dongle during execution of the identified software application. For example, in an embodiment in which the IO device prioritized performance metric of interest is a low inter-frame latency, a single data packet communication frame profile that selects a data packet number of one and a data packet length of 8 Bytes may have been identified at block 508 as a potential candidate frame profile best suited for transceiving of data packets between the wireless IO device 380 and the wireless communications dongle 330 during execution of the identified software application (e.g., computer graphics generation application). As another example, in an embodiment in which the IO device prioritized performance metric of interest is a high data packet transmission rate, a single data packet communication frame profile that selects a data packet number of four and a data packet length of 8 Bytes may have been identified at block 508 as a potential candidate frame profile best suited for transceiving of data packets between the wireless IO device 380 and the wireless communications dongle 330 during execution of the identified software application (e.g., software update application). In still another example, in an embodiment in which the IO device prioritized performance metric of interest is a high dongle report rate, a plurality of data packet communication frame profiles that select a data packet number of two, three, or four and a data packet length of 16 Bytes may have been identified at block 508 as potential candidate frame profiles best suited for transceiving of data packets between the wireless IO device 380 and the wireless communications dongle 330 during execution of the identified software application (e.g., gaming application).

If more than one potential candidate data packet communication frame profile has been identified at block 508, there may be a need to narrow down the potential candidates to a single data packet communication frame profile. In such a case, the method may proceed to block 512 to determine if other wireless IO device prioritized performance metrics (e.g., other than the IO device prioritized performance metric of interest identified at block 506) are associated with the identified software application that could inform such a narrowing process.

If a single potential candidate data packet communication frame profile has been identified at block 508, there may be no need for such a narrowing process. In such a case, the single data packet communication frame profile identified at block 508 may be used to select the wireless IO device application suited data packet number and the wireless IO device application suited data packet length. For example, in an embodiment in which the IO device prioritized performance metric of interest is a low inter-frame latency, the wireless IO device application suited data packet number of one may be selected and the wireless IO device application suited data packet length of 8 Bytes may be selected for transceiving of data packets between the wireless IO device 380 and the wireless communications dongle 330 during execution of the identified software application (e.g., computer graphics generation application). As another example, in an embodiment in which the IO device prioritized performance metric of interest is a high data packet transmission rate, the wireless IO device application suited data packet number of four may be selected and the wireless IO device application suited data packet length of 8 Bytes may be selected for transceiving of data packets between the wireless IO device 380 and the wireless communications dongle 330 during execution of the identified software application (e.g., computer graphics generation application). The method for selecting the wireless IO device application suited data packet number and the wireless IO device application suited data packet length suited for execution of the identified software application may then end.

The controller for the wireless communication adapter/dongle or wireless radio system for an information handling system executing code instructions of the software application performance-specific IO device wireless communication packet polling and reception system in an embodiment at block 512 may determine whether other wireless IO device prioritized performance metrics have been identified for the software application identified at block 502 as currently executing at the information handling system. In an embodiment in which a plurality of data packet communication frame profiles have been identified at block 508 as potential candidate frame profiles best suited for transceiving of data packets between the wireless IO device 380 and the wireless communications dongle 330 during execution of the identified software application, a second wireless IO device prioritized performance metric may be used to narrow the candidate frame profiles down to one. For example, in an embodiment, a plurality of data packet communication frame profiles that select a data packet number of two, three, or four and a data packet length of 16 Bytes may have been identified at block 508 as potential candidate frame profiles. In such an embodiment, the controller for the wireless communication adapter/dongle 330 or wireless radio system for an information handling system 300 executing code instructions of the software application performance-specific IO device wireless communication packet polling and reception system may refer to the wireless IO device 380 performance policy to determine if the user or developer of the software application determined at block 502 to be currently executing at the information handling system has identified a second wireless IO device prioritized performance metric (e.g., one having a lower priority than the wireless IO device prioritized performance metric identified at block 506, but still identified as impacting performance of the currently executing software application). For example, in an embodiment in which high dongle report rate was identified at block 506 as the IO device prioritized performance metric of interest, it may be determined at block 512 that low inter-frame latency is identified as a second wireless IO device prioritized performance metric for the identified software application, having a lower priority than the high dongle report rate, as identified by a user or developer of the identified software application. As another example, in an embodiment in which high dongle report rate was identified at block 506 as the IO device prioritized performance metric of interest, it may be determined at block 512 that high data packet transmission rate is identified as a second wireless IO device prioritized performance metric for the identified software application, having a lower priority than the high dongle report rate, as identified by a user or developer of the identified software application.

In other embodiments, wireless IO device prioritized performance metrics may be used at block 512 to narrow a number of candidate frame profiles based on minimum or maximum threshold levels of wireless IO device prioritized performance metrics. These minimum or maximum threshold levels of wireless IO device prioritized performance metrics may be other than a high priority metric and used to maintain a baseline of performance of a wireless IO device during execution of an identified software application in some embodiments.

If no other wireless IO device prioritized performance metrics are associated with the identified software application, the controller for the wireless communication adapter/dongle 330 or wireless radio system for an information handling system 300 executing code instructions of the software application performance-specific IO device wireless communication packet polling and reception system in an embodiment may select the wireless IO device application suited packet number and wireless IO device application suited packet length from any of the potential candidate data packet communication frame profiles identified at block 508 or may choose one that maximizes the highest priority wireless IO prioritized performance metric for the wireless IO device, and the method may then end. If other wireless IO device prioritized performance metrics are associated with the identified software application, the method may proceed to block 514 for narrowing of the potential candidate data packet communication frame profiles best suited for execution of the identified software application.

At block 514, the controller for the wireless communication adapter/dongle or wireless radio system for an information handling system executing code instructions of the software application performance-specific IO device wireless communication packet polling and reception system in an embodiment may narrow the potential candidates frame profiles suited for transceiving of data packets between the wireless IO device and the wireless communications dongle during execution of the identified software application to potential candidate frame profiles that best improve the other identified wireless IO device prioritized performance metrics having priority for an identified software application. For example, in an embodiment in which a low inter-frame latency is given as a second wireless IO device prioritized performance metric for the identified software application, the controller for the wireless communication adapter/dongle 330 or wireless radio system for an information handling system 300 executing code instructions of the software application performance-specific IO device wireless communication packet polling and reception system may select a wireless IO device application suited data packet number of two and a wireless IO device application suited data packet length of sixteen Bytes as the frame profile. Selection of this candidate frame profile is associated with a lowest inter-frame latency of 435 μs (in comparison to other candidate data packet communication frame profiles having a dongle report rate of 8,000 Hz which have longer latency). Accordingly, this selected frame profile is best suited for transceiving of data packets between the wireless IO device 380 and the wireless communications dongle 330 during execution of the identified software application as meeting a first prioritized and second prioritized wireless IO device prioritized performance metrics. In another embodiment, a maximum frame latency may be set as a wireless IO device prioritized performance metric for an identified software application (e.g., 440 μs) making selection of the above candidate frame profile meet the highly prioritized wireless IO device prioritized performance metric as well as the limitation on frame latency to maintain a baseline level of performance for the wireless IO device.

In another such example embodiment, a high data packet transmission rate may be given as a second priority wireless IO device prioritized performance metric for the identified software application. In such an example embodiment, the controller for the wireless communication adapter/dongle 330 or wireless radio system for an information handling system 300 executing code instructions of the software application performance-specific IO device wireless communication packet polling and reception system may select a wireless IO device application suited data packet number of four and a wireless IO device application suited data packet length of sixteen Bytes as a frame profile. This frame profile is selected among other candidate profiles because it is associated with a highest data packet transmission rate of 5,200 Hz (in comparison to other candidate data packet communication frame profiles having a dongle report rate of 8,000 Hz) and is therefore best suited for transceiving of data packets between the wireless IO device 380 and the wireless communications dongle 330 during execution of the identified software application. In other embodiments, a minimum data packet transmission rate may be set as another wireless IO device prioritized performance metric for an identified software application (e.g., 5,100 Hz) making selection of the above candidate frame profile meet the highly prioritized wireless IO device prioritized performance metric as well as the limitation on data packet transmission rate to maintain a baseline level of performance for the wireless IO device.

The method for selecting a wireless IO device application suited data packet number and length may then end. In such a way, the software application performance-specific IO device wireless communication packet polling and reception system may tailor the selected number of packets and selected packet lengths identified within these polling packets for high performance of one or more software applications executing at the information handling system.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A software application performance-specific input/output (IO) device wireless communication packet polling and reception system executing at an information handling system comprising:

a controller to transmit a polling packet, via a wireless communication dongle or adapter, with a specified number of packets and a specified packet length and an acknowledgement of received packets to an operatively coupled wireless IO device including instructions to return a packet frame of the specified number of packets at the specified packet lengths via a wireless link;

the controller executing code instructions of the software application performance-specific input/output (IO) device wireless communication packet polling and reception system to identify a software application currently executing at the information handling system and a wireless IO device prioritized performance metric prioritized as impacting performance of the software application, where wireless IO device prioritized performance metric is selected from a dongle report rate of the wireless communication dongle, a packet frame latency, and a data packet transmission rate; and the controller executing code instructions of the software application performance-specific IO device wireless communication packet polling and reception system to select a wireless IO device application suited data packet number as the specified number of packets and a wireless IO device application suited data packet length as the specified packet length for the packet frame estimated to meet the wireless IO device prioritized performance metric during execution of the software application.

2. The software application performance-specific IO device wireless communication packet polling and reception system of the information handling system of claim 1, wherein the wireless IO device is a wireless mouse and the wireless IO device prioritized performance metric prioritized for the software application is the dongle report rate defining a speed at which one of a plurality of positional measurements of the wireless IO device is transmitted to the wireless communication dongle.

3. The software application performance-specific IO device wireless communication packet polling and reception system of the information handling system of claim 1, wherein the wireless IO device prioritized performance metric prioritized for the software application is a frame latency that is short between transmission of consecutive packet frames.

4. The software application performance-specific IO device wireless communication packet polling and reception system of the information handling system of claim 1, wherein the wireless IO device prioritized performance metric prioritized for the software application is a data packet transmission rate.

5. The software application performance-specific IO device wireless communication packet polling and reception system of the information handling system of claim 1, wherein the specified packet length is 16 bytes to accommodate transmission of two sets of positional information for the wireless IO device within one of the specified number of packets.

6. The software application performance-specific IO device wireless communication packet polling and reception system of the information handling system of claim 1, wherein the specified packet number is greater than one to increase data packet transmission throughput in a noise radio frequency (RF) environment.

7. The software application performance-specific IO device wireless communication packet polling and reception system of the information handling system of claim 1 further comprising:
  the controller to determine a change in execution phase of the software application and adjust the wireless IO device application suited data packet number as the specified number of packets and adjust the wireless IO device application suited data packet length as the specified packet length for the packet frame estimated to meet a second wireless IO device prioritized performance metric via transmission of a second, later polling packet.

8. A method of orchestrating application optimized transmission of data packets between a wireless communication dongle of an information handling system and a wireless mouse comprising:
  transmitting, via a wireless communication dongle or adapter radio, a polling packet including a specified number of packets and a specified packet length and an acknowledgement of received packets to an operatively coupled wireless IO device including instructions to return a packet frame of the specified number of packets at the specified packet lengths via a Bluetooth® Low Energy radio wireless link;
  identifying, via a controller for the wireless communication dongle, a software application currently executing at the information handling system and a wireless IO device prioritized performance metric identified by a developer of the software application as impacting performance of the software application, where the IO device prioritized performance metric is affected by the specified number of packets and the specified packet length in a packet frame returned via the wireless link; and
  identifying, via the controller, a wireless IO device application suited data packet number as the specified packet number and a wireless IO device application suited data packet length as the specified packet length estimated to meet the wireless IO device prioritized performance metric prioritized for performance of execution of the software application.

9. The method of claim 8, wherein the wireless IO device prioritized performance metric is a frame latency between transmission of consecutive packet frames prioritized for the executing software application.

10. The method of claim 8, wherein the wireless IO device prioritized performance metric is a report rate of the wireless communication dongle or adapter radio defining a speed at which wireless IO device data is transmitted to the wireless communication dongle or the adapter radio.

11. The method of claim 8, wherein the wireless IO device is a wireless mouse and the wireless IO device prioritized performance metrics is a report rate for the wireless communication dongle or the adapter radio defining a speed at which one of a plurality of positional measurements of the wireless mouse is transmitted to the wireless communication dongle or the adapter radio.

12. The method of claim 8, wherein plural wireless IO device prioritized performance metrics are prioritized at different levels of priority to select a frame profile with the wireless IO device application suited data packet number as the specified packet number and the wireless IO device application suited data packet length as the specified packet length estimated to meet the plural wireless IO device prioritized performance metrics for performance of execution of the software application.

13. The method of claim 8, wherein a first wireless IO device prioritized performance metrics is a report rate of the wireless communication dongle defining a speed at which wireless IO device data is transmitted to the wireless communication dongle, and there is a limited threshold for a second wireless IO device prioritized performance metric to maintain a baseline of performance for the executing software application.

14. The method of claim 8, wherein a first wireless IO device prioritized performance metrics is a report rate for the wireless communication dongle defining a speed at which wireless IO device data is transmitted to the wireless communication dongle, and there is a limited threshold for other wireless IO device prioritized performance metrics to maintain a baseline of performance for the executing software application.

15. A software application performance-specific input/output (IO) device wireless communication packet polling and reception system executing at a wireless communication dongle operatively coupled to an information handling system comprising:
  a controller to transmit a polling packet, via the wireless communication dongle, with a specified number of packets and a specified packet length and an acknowledgement of received packets to an operatively coupled wireless IO device including instructions to return a packet frame of the specified number of packets at the specified packet lengths via a wireless link;
  the controller executing code instructions of the software application performance-specific input/output (IO) device wireless communication packet polling and reception system to identify a first software application executing at the information handling system and a first wireless IO device prioritized performance metric prioritized as impacting performance of the first software application;
  the controller executing code instructions to select a wireless IO device application suited data packet number as the specified number of packets and a wireless IO device application suited data packet length as the specified packet length for the packet frame estimated to meet the first wireless IO device prioritized performance metric during execution of the first software application;
  the controller executing code instructions to identify a switch to a second software application executing at the information handling system and a second wireless IO device prioritized performance metric prioritized as impacting performance of the second software application; and
  the controller to adjust the wireless IO device application suited data packet number as the specified number of packets and adjust the wireless IO device application suited data packet length as the specified packet length for the packet frame estimated to meet the second wireless IO device prioritized performance metric via transmission of a second, later polling packet.

16. The software application performance-specific IO device wireless communication packet polling and reception system of the information handling system of claim 15, wherein the specified packet length is 16 bytes to accommodate transmission of two sets of positional information for the wireless IO device within one of the specified number of packets.

17. The streamlined IO device wireless communication packet polling and reception system of the wireless communication dongle of claim 15, wherein the wireless IO device communicates with the wireless communication dongle via a wireless link established according to Bluetooth® Low Energy (BLE) radio layer protocol.

18. The software application performance-specific IO device wireless communication packet polling and reception system of the wireless communication dongle of claim 15, wherein the first software application is a gaming software application and the first application wireless IO device prioritized performance metric is a report rate of the wireless communication dongle defining a speed at which data from the wireless IO device is wirelessly transmitted to the wireless communication dongle.

19. The software application performance-specific IO device wireless communication packet polling and reception system of the wireless communication dongle of claim 15, wherein the second software application is a computer graphics generation application and the second application wireless IO device prioritized performance metric is a latency between transmission of consecutive packet frames.

20. The software application performance-specific IO device wireless communication packet polling and reception system of the wireless communication dongle of claim 15, wherein the controller adjusts the wireless IO device application suited data packet number as the specified number of packets and adjusts the wireless IO device application suited data packet length as the specified packet length for the packet frame estimated to meet a third wireless IO device prioritized performance metric prioritized for a new execution phase of the first software application.

* * * * *